Sept. 24, 1957 R. MERCER 2,807,672
TELECOMMUNICATION SYSTEMS
Filed Oct. 18, 1954 17 Sheets-Sheet 2

*Inventor*
RICHARD MERCER
By
*Attorneys*

Sept. 24, 1957 R. MERCER 2,807,672
TELECOMMUNICATION SYSTEMS
Filed Oct. 18, 1954 17 Sheets-Sheet 3

Inventor
RICHARD MERCER
By
Lippincott & Smith
Attorneys

Inventor
RICHARD MERCER

Sept. 24, 1957  R. MERCER  2,807,672
TELECOMMUNICATION SYSTEMS
Filed Oct. 18, 1954  17 Sheets-Sheet 13

Inventor
RICHARD MERCER
By
Lippincott + Smith
Attorneys

Sept. 24, 1957  R. MERCER  2,807,672
TELECOMMUNICATION SYSTEMS
Filed Oct. 18, 1954  17 Sheets-Sheet 14
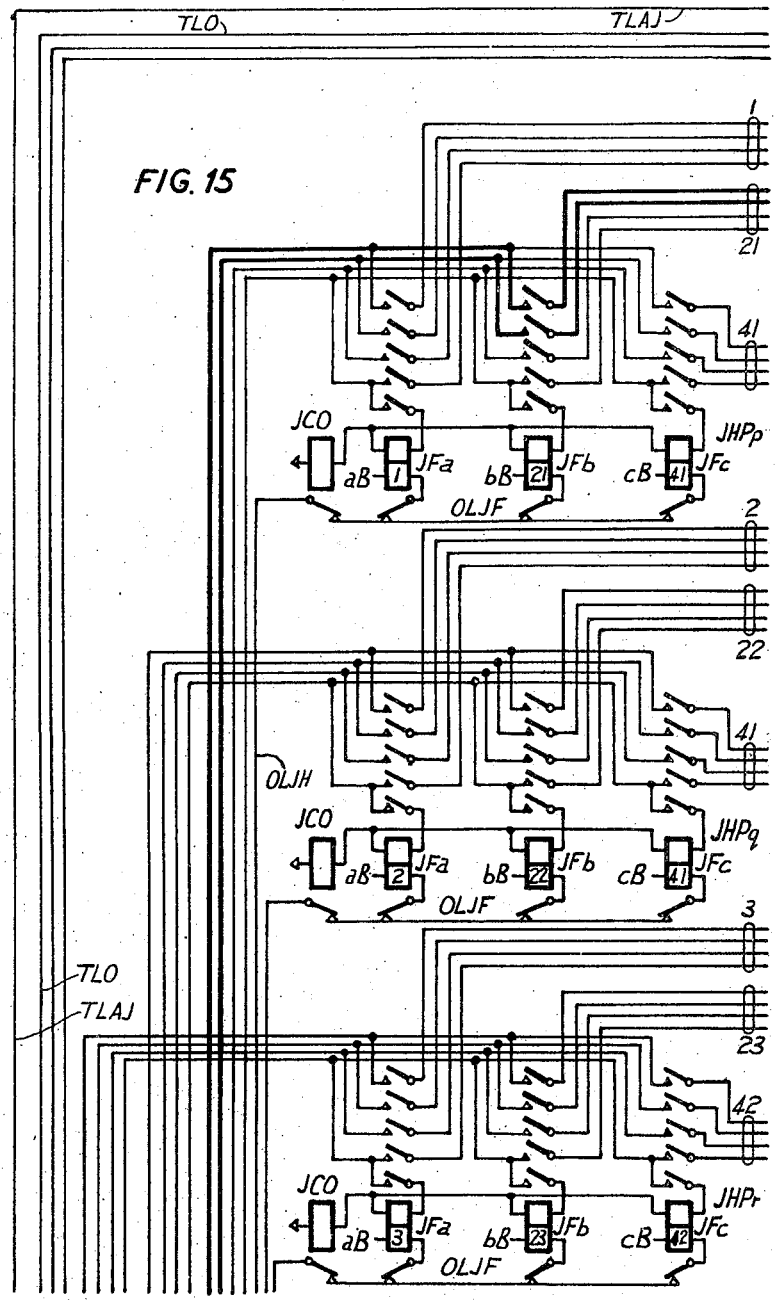
Inventor
RICHARD MERCER
By
Attorneys

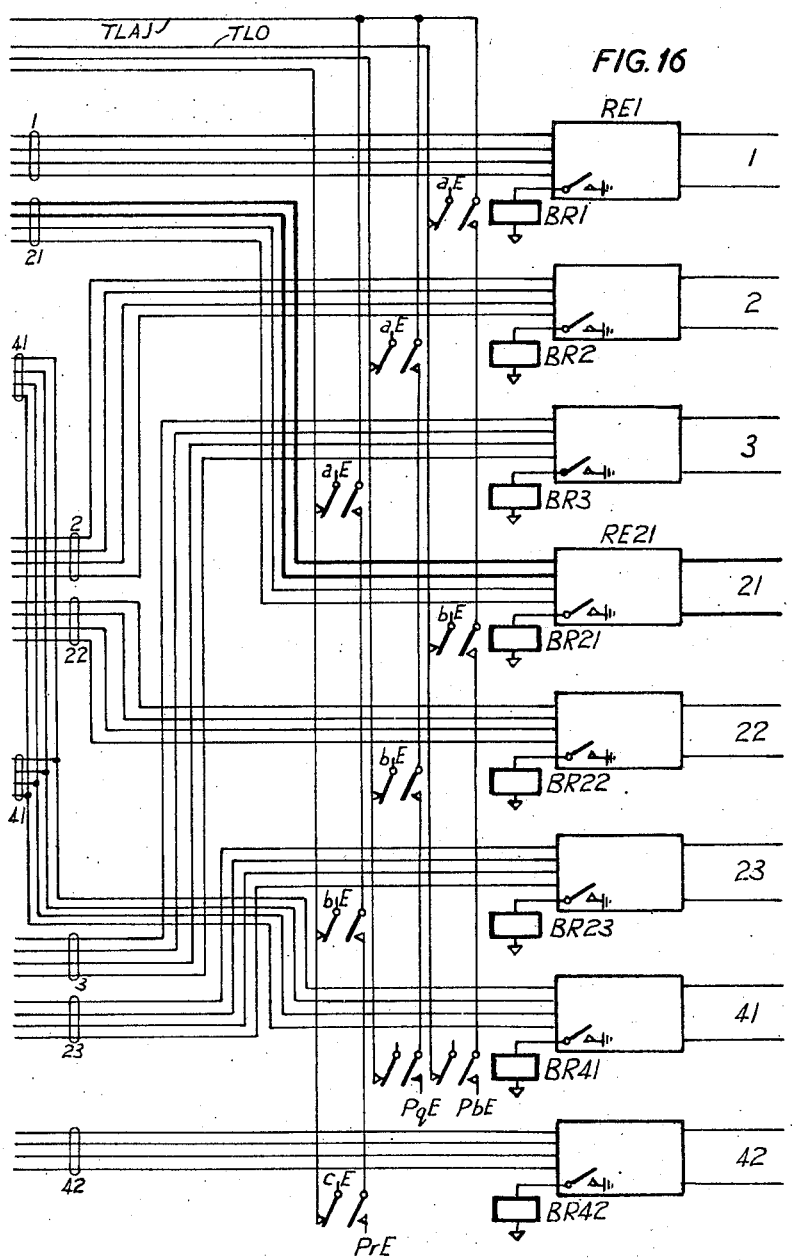

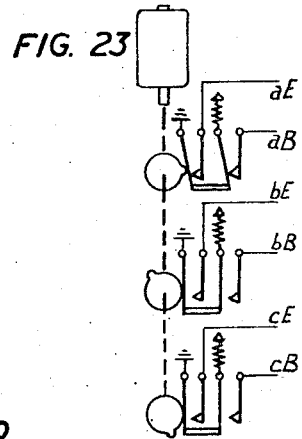
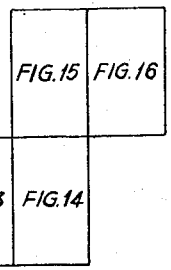
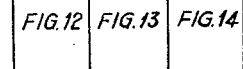
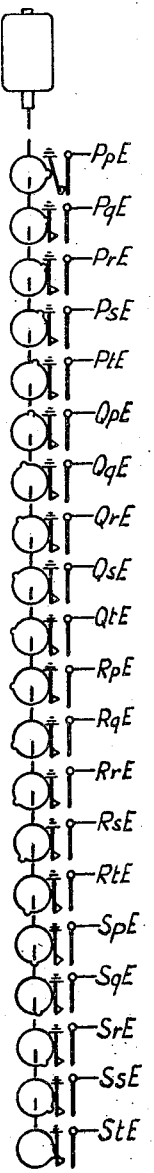

Sept. 24, 1957  R. MERCER  2,807,672
TELECOMMUNICATION SYSTEMS
Filed Oct. 18, 1954  17 Sheets-Sheet 17

Inventor
RICHARD MERCER.
By
Lippincott + Smith
Attorneys

United States Patent Office 2,807,672
Patented Sept. 24, 1957

2,807,672

TELECOMMUNICATION SYSTEMS

Richard Mercer, St. Lawrence, Isle of Wight, England

Application October 18, 1954, Serial No. 462,986

3 Claims. (Cl. 179—18)

This application constitutes a continuation-in-part of United States patent application Serial No. 226,131, now Patent Nos. 2,750,448 and 226,134, now abandoned, both filed May 14, 1951.

The present invention concerns improvements in or relating to telecommunication systems and more particularly concerns arrangements for making efficient use of groups of junction or trunk lines or of groups of expensive equipment.

In my U. S. Patent No. 2,644,041 I have described arrangements for setting up calls over any one of a limited number of routes, the multiposition switching devices comprising such routes having no group selection. As it is usual in such arrangements to have only a single outlet for each setting of the multiposition switching devices in each route, it is clear that when an interexchange call is being set up as determined by the operation of a multiposition switching device, there is a tendency for such outlets to be used somewhat inefficiently as the routes per stage provided is usually somewhat greater than would be provided with group selection. This is, of course, immaterial if the only additional cost is of an inexpensive nature, such as extra cabling between ranks of selectors which may be offset by the total reduction of cabling between selectors. Further the additional equipment required for route selection is offset by the simplification or reduction in the number of multiposition switching devices when using route selection as compared with group selection.

The word "route" is used herein to comprise a plurality of stages of multiposition switching devices one for each stage which devices function either as finders or numerical selectors without group selection in a single exchange and enable a call to be set up from any incoming line whether a subscriber's line or junction line from another exchange to any outgoing subscriber's line, or to any group outgoing junction lines, the incoming lines being divided into groups such that only one call can be set up from a group over a single route, but more than one call can be set up to different destinations over the same route if they originate in different groups of incoming lines. More than one call from the same group of incoming lines can be set up over different routes.

Where expensive junction lines or PBX lines are involved or if it is desired to select expensive equipment, the additional quantity of such equipment required with route selection might offset the saving otherwise effected by employing route selection and it is an object of the present invention to ensure that expensive equipment such as referred to above is efficiently used, and to this end the group of junction lines leading to a particular exchange to which access may be had over one or more selector stages, is subdivided so that there is at least one point of access to a sub-division of each group available for each route, such point of access which is accessible from a plurality of groups of incoming lines is either connected directly to a junction line, either individually or in common with other points of access or may be connected through an intermediate switch of a limited capacity to any of two, three or more junction lines of a group, the particular arrangement being dependent upon the number of junction lines in the group considered.

According therefore to one feature of the invention a telecommunication exchange is provided employing switching devices each having an inlet giving access to a number of outlets, each outlet of each switch having a different numerical significance, the switching devices being divided into a plurality of groups, a selecting device associated with each group for finding an idle route for setting up a given connection from an idle inlet of a given group of switches to an idle line of a group of lines leading to another exchange or to expensive equipment an outlet or outlets of each switching device of the group having numerical significances corresponding to those of lines leading to other exchanges or to expensive equipments are multipled respectively to outlets having corresponding numerical significances of a switching device selected from each of a number of said groups, such multipled outlets giving access direct to at least one of said lines, the arrangement being such that the route selected by said selecting devices when connection is required to one of said lines includes an idle switching device of said group giving access to an idle one of said lines.

The inlets of a group of switching devices would usually be assigned to a group of calling lines, particularly where the switching devices are located in the main train, and while this is not essential in the description referring to the drawings herein where reference is made to a group of calling lines, it applies equally to a group of switching devices whose inlets are accessible only to a group of calling lines.

According therefore to another feature of the invention if the junction lines or expensive equipments are in large groups a non-numerical switching device is provided which is common to the outlets of a number of switches in the same route whereby the maximum availability for a particular group of calling lines is increased by a factor depending upon the capacity of the hunting device, the maximum total availability equalling the number of routes times the capacity of the hunting device.

Where the number of junction lines or lines leading to expensive equipment is less than the maximum number of outlets for giving access to said lines, corresponding outlets of multiposition switching devices of a number of routes at a particular switching stage are multipled together. Such multipled outlets amy lead in common to a non-numerical switching device where the group of expensive equipments is of an intermediate size.

The invention will be better understood by referring to the accompanying drawings which illustrate by way of example only, different ways of carrying the invention into effect, in which:

Figure 1 illustrates the equipment of the various routes which can be taken into use by any subscriber or subscribers of a group of $A^2$ lines (e. g. 100).

Figure 2 illustrates equipment of the various routes which can be taken into use from an incoming junction line.

Figure 3 illustrates the equipment associated with a particular route indicating the various groups of lines, local and junction, which have access to the equipment of a single route.

Figure 4 illustrates a first-stage-finder acting as a finder-final allocated to the said route as a finder and another route as a final selector together with the subscriber's line equipment.

Figure 5 illustrates a second-stage-finder of said route and means for giving a busy signal from equipment associated therewith.

Figure 6 illustrates an exchange digit selector of said route permanently associated with the second-stage-finder, a junction hunter of said route and a junction repeater together with battery feed and ringing equipment for local calls which are associated with a first digit selector of said route.

Figures 7 and 8 illustrate an impulse responder including an impulse responder finder, route selecting means, impulse steering switches, impulse control relays, second-stage-finder and fourth digit responder individual to a particular group of calling lines.

Figure 9 shows an exchange digit responder together with hunting means for an idle dial repeater for interoffice calls and hunting means for an idle first-digit responder for local calls.

Figures 12–16 arranged as illustrated in Figure 17 indicate, by way of example, one way of carrying the invention into effect.

Figures 18–21 illustrate, by way of example, different ways in which the junction lines or like equipment are made available to corresponding groups of multiposition switching devices in the various routes. It will be understood that junctions may be replaced by lines leading to groups of expensive equipment to which access may be had by a numerical selection.

Figure 22 illustrates a cyclic interrupter for connecting earth potential to the multiposition switching devices of various routes and to the route finder for the purpose of controlling route selection.

Figure 2:
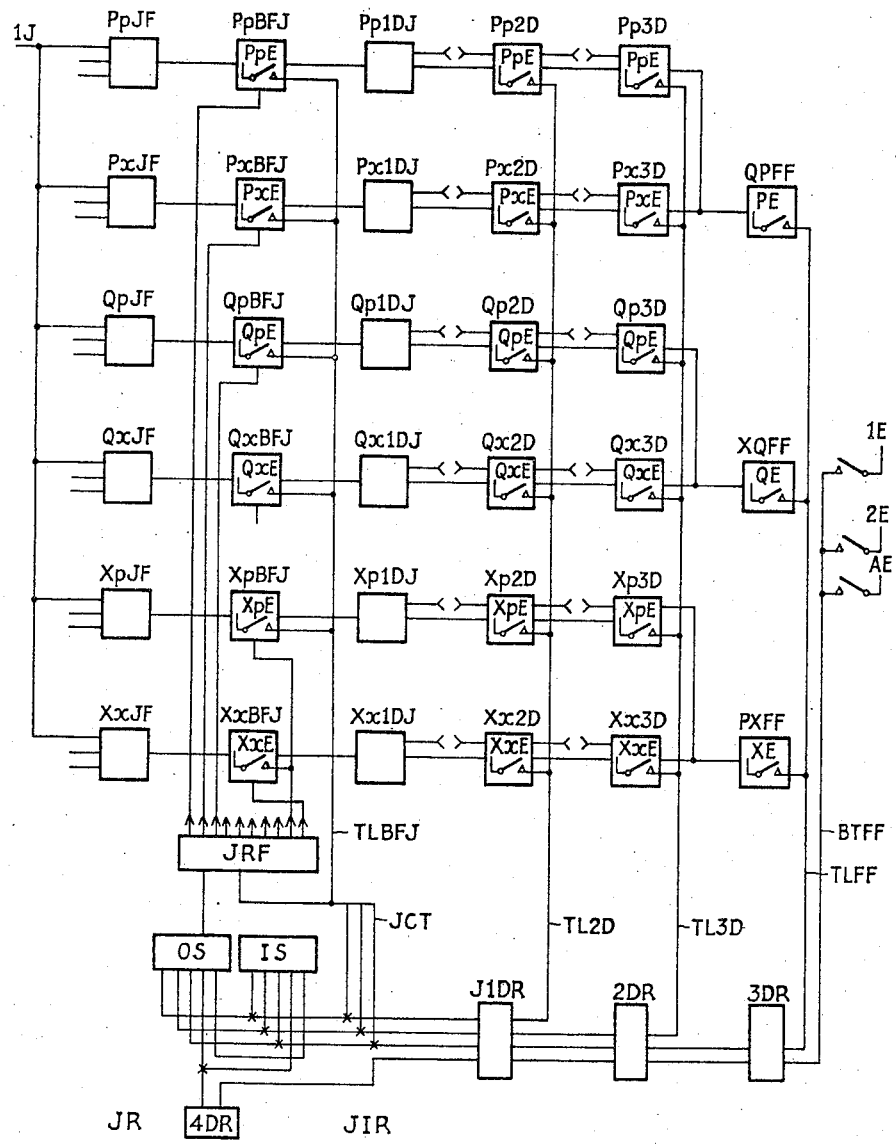
Figure 3:
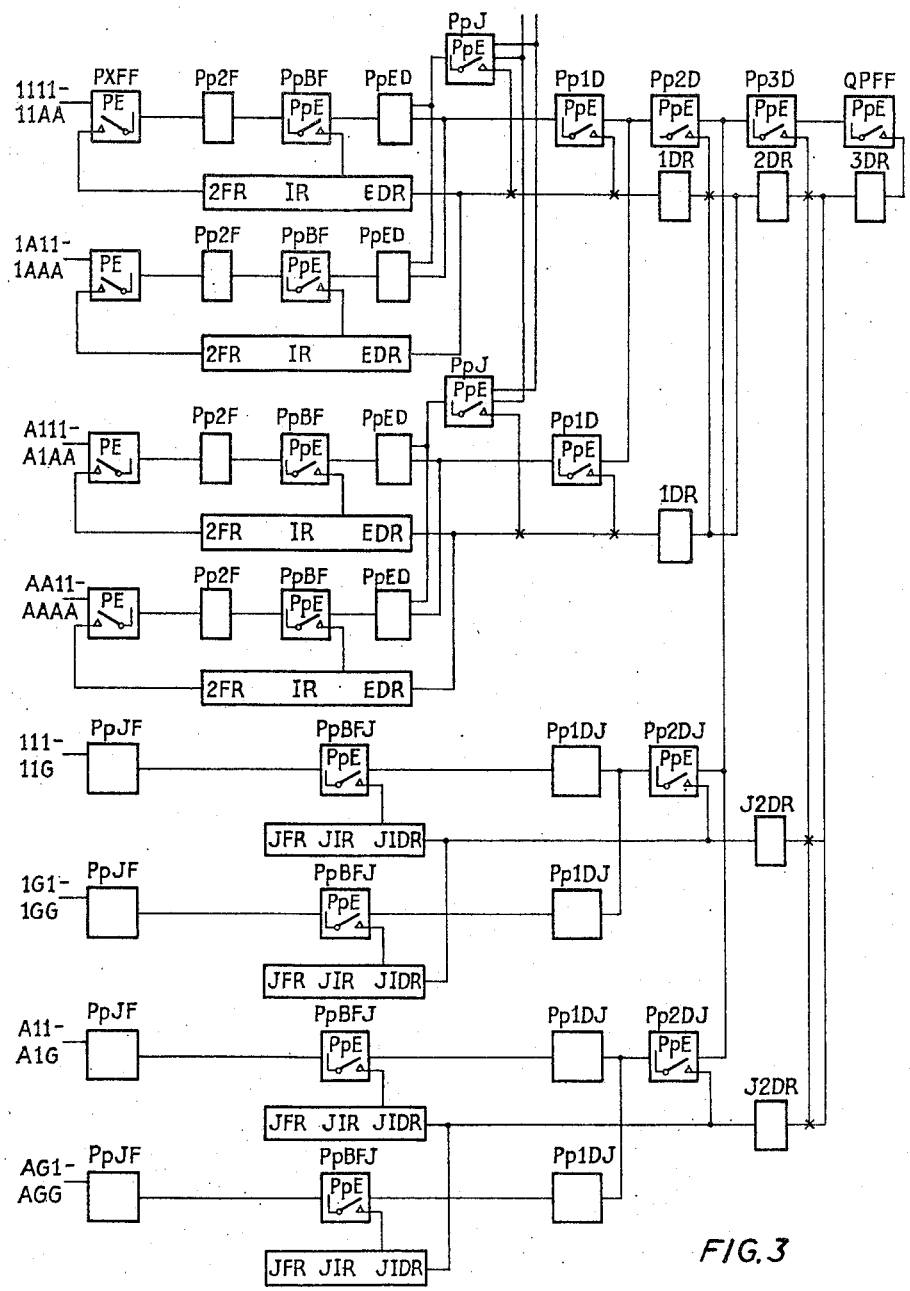
Figure 24:
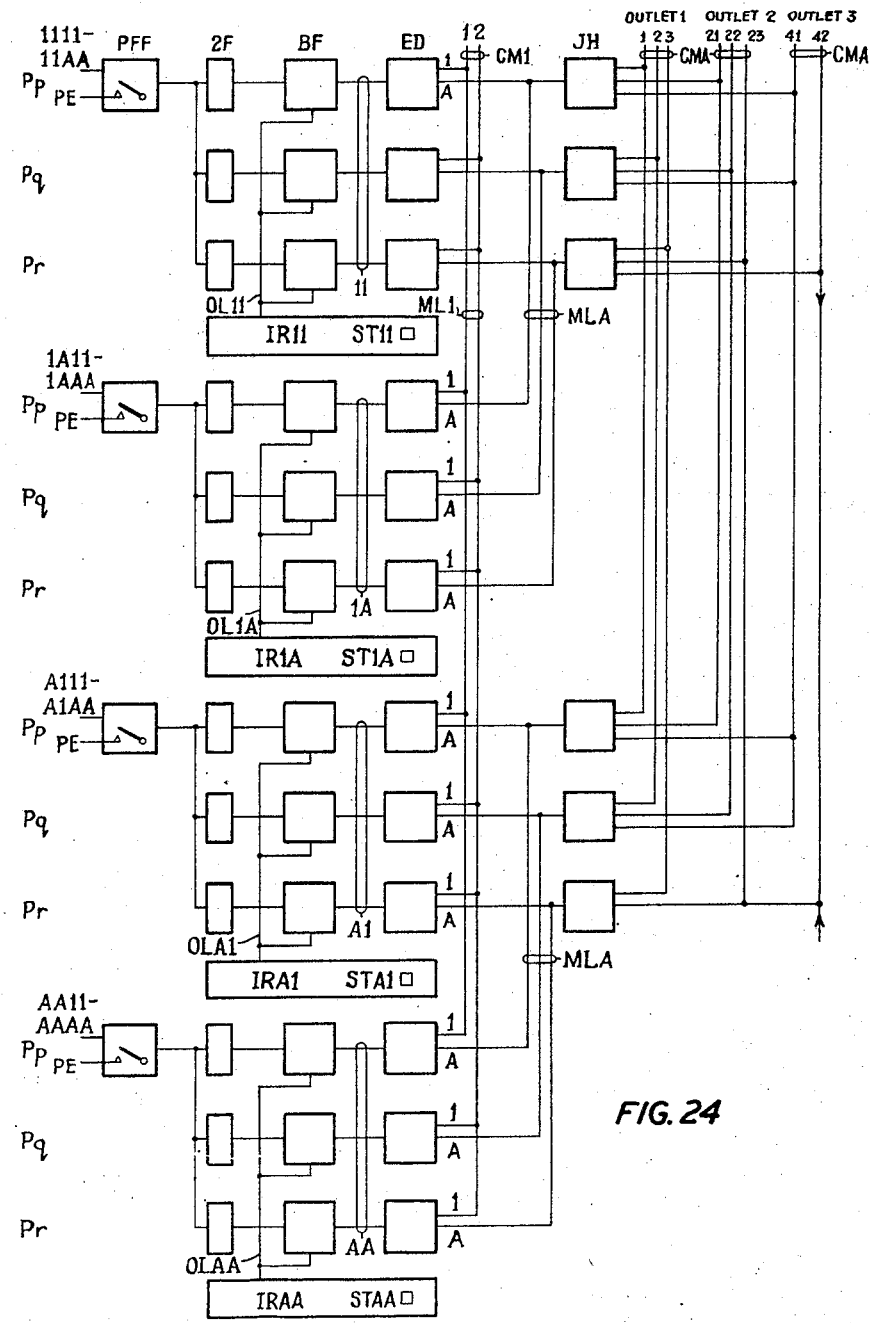

Figure 23 shows a cyclic interrupter for controlling the operation of a hunting device interposed between multiposition switching devices and the junction lines or like equipment and Figure 24 shows how the arrangement of Fig. 3 and Fig. 2 may be combined for dealing with groups of junction lines as set out in Figs. 18 and 20.

Figure 1:
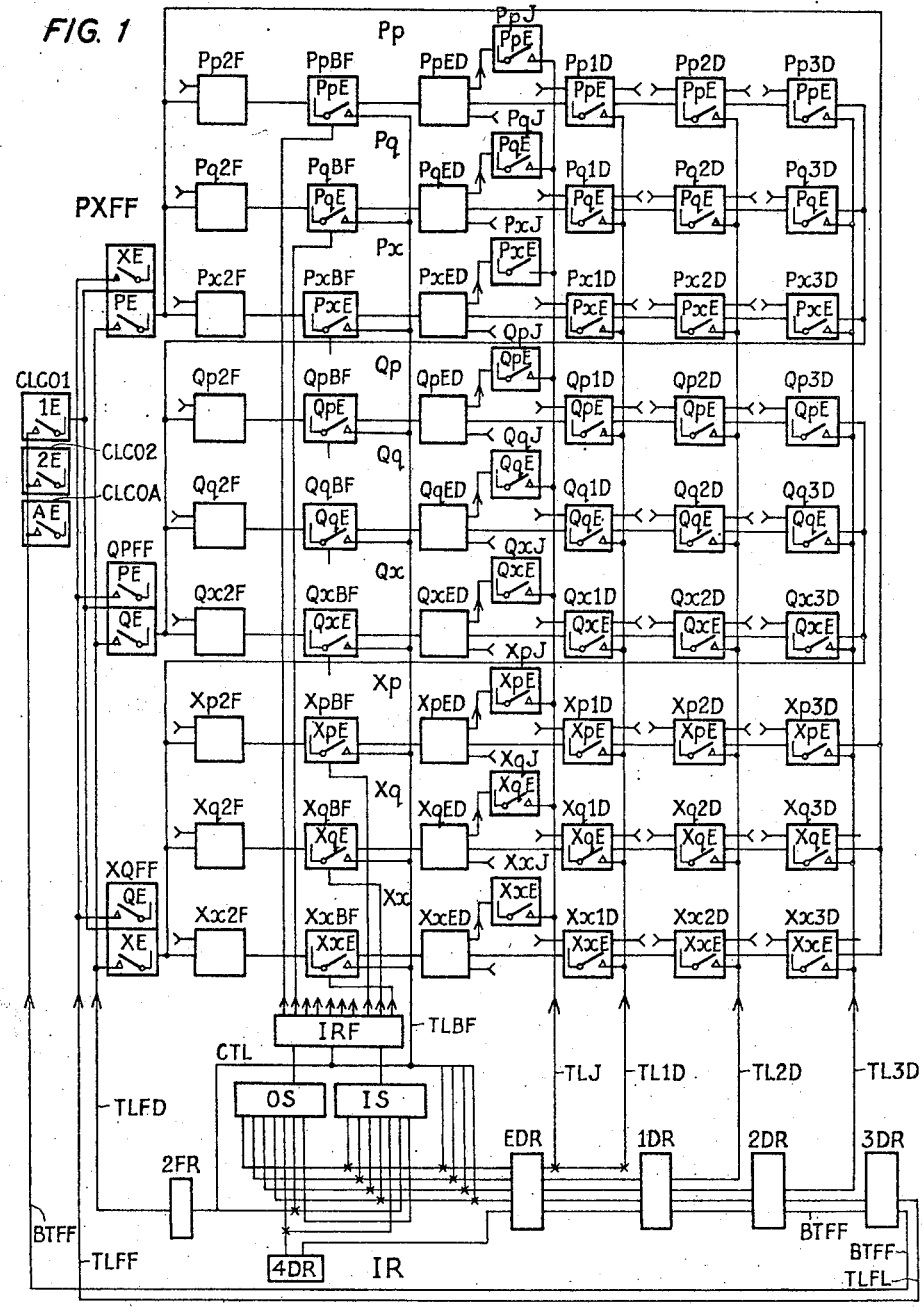
Figures 1–3 illustrate in schematic form the equipment required for an exchange.

The general layout of an automatic telephone system for an exchange in a multi-exchange area will be appreciated from a study of Figs. 1, 2 and 3. The exchange illustrated is assumed to have a capacity of $A^4$ lines, e. g. 10,000 and to form part of an area of A exchanges (e. g. 10).

These figures illustrate the component equipments by rectangles, details of such equipments and their electrical circuits being described hereinafter and separately illustrated in other figures.

Fig. 1 illustrates the equipment of the various routes local to the exchange in which a call originates which equipment may be involved in a connection originating from any line of a group of $A^2$ (e. g. 100) lines connected to said exchange.

Fig. 2 illustrates the equipment of the various routes in an exchange to which a call is extended over a selected group of junction lines incoming to said exchange.

Fig. 3 illustrates the exchange equipment involved in a single route such that if the switching devices required for setting up a connection to a particular destination are idle a connection can be set up over the route to which the switching devices belong in the originating exchange either from any line in such exchange or from any junction line incoming to said exchange and to either an idle junction leading to any other exchange in the area or to another line in the same exchange. Figure 3 illustrates that part of the invention concerned with the multipling of selected outlets.

Referring to Figure 1 the routes are represented by the references P$p$, P$q$, P$x$, Q$p$, Q$q$, Q$x$, X$p$, X$q$, X$x$ and each route includes a number of components, the references thereto having prefixes corresponding to the route reference and followed by the references distinctive of the particular components such as BF, which generally refers to busy tone feeding equipment, but may in certain circumstances include battery feed equipment, exchange digit selector ED, first digit selector 1D, junction selector J, second digit selector 2D, third digit selector 3D and a second stage finder 2F. The first stage finder is combined with a fourth or final digit selector and the combination is given the reference FF and will hereinafter be referred to as "finder final." As the traffic for the number of lines for which the finder final is designed is small, the number required is very much less than the number of routes and for this reason it is convenient to multiple a number of routes together. The finder final, in the example considered, has different route significances according as to whether it is acting as a finder or final switch and is assumed to be common to those routes having the same prefix letter, the first prefix letter referring to its operation as a finder and the second prefix letter to its operation as a final selector and has these prefix letters included in its reference. As each route must necessarily involve two different finder finals which conveniently are both common to the routes P$p$, P$q$, P$x$, the prefix P is included in the reference to both these finder finals. The two finder finals of a route must of course be different, as it is impossible for the same switching device to be used as a finder and final of the same route, seeing that this would prevent connections being set up between subscribers to which a particular finder final has access. Hence the combined outlets from the third digit selectors of the routes which choose the same finder final has access to a final digit selector which is combined with a finder belonging to another set of routes.

To illustrate this in a convenient form a finder final in addition to the suffix FF is preceded by two letters the first one for indicating the designation of the route having the same prefix with which it is associated as a finder, and the second for indicating the route with which it is associated as a fourth digit or final selector.

For instance as illustrated, the third digit selectors 3D of the routes P$p$, P$q$, P$x$, have access in common to the finder final QPFF with the first prefix reference Q, those of Q$p$, Q$q$, Q$x$ to the finder final XQFF with the first prefix reference X and those of X$p$, X$q$, X$x$ to the finder final PXFF with the first prefix reference P.

It should be understood that it is not essential that every finder final should be the combined outlet of the same number of routes. Again it is not essential that finders and final selectors should be combined in which case the finders and finals might be individual to the same set of routes. In fact so many rearrangements are possible that the drawing must simply be taken as indicating an arrangement which while particularly convenient for the purposes of illustration, and having conveniences which may commend it in practice if traffic conditions are suitable, is not intended in any way to restrict the scope of the invention claimed. Similarly just as finder finals may be made common to a number of routes in view of the light traffic they carry, so third digit and other selectors may be made common to two or more circuits if the traffic is sufficiently light, in which case separate contacts corresponding to each such route might be provided in connection with each such selector for marking the common conductor.

It should also be understood that the references P, Q, X represent sub multiples or sub divisions of the routes P$p$, P$q$, P$x$, Q$p$, Q$q$, Q$x$, X$p$, X$q$, X$x$ respectively and are intended to represent a general case of which three only are illustrated; for instance it may be desirable to have four or five finder finals to a ten line group and three or four times as many routes. Each finder final such as PXFF, QPFF, XQFF has access to A lines of which CLCO1, CLCO2, CLCOA represent the lines and cut-off relays.

Conveniently but not essentially, the battery feeding equipment is located individual to the junction repeaters and individual to the first digit selectors respectively while busy-feed equipment BF is located between the second stage finder 2F and the exchange digit selector ED so that these three units are permanently connected together. The battery feeding equipment conveniently includes relays, through the windings of which battery is fed to the calling line and towards the called line, ringing relays and associated equipment which is more particularly described hereinafter. The busy feed equipment enables busy tone to be fed to the calling subscriber until he hangs up with the minimum of equipment in use.

The second stage finder 2F of each route has access to finder finals (where A may equal 10 if the decimal system is used for the switching devices used in setting up connections) and each finder final has access to A lines so that second stage finders and exchange selectors are provided in groups according to the number of routes and in common to $A^2$ lines. This is convenient for the purpose of illustrating the invention in as simple a form as possible and might well prove advantageous under certain practical conditions. As however conditions vary considerably it may be found desirable to reduce the number of exchange selectors by making them available to say $2A^2$ or $3A^2$ lines with consequent modifications, such as a larger second stage finder or an additional finder stage which those skilled in the art will be readily able to devise from the description herewith.

The exchange digit selector ED in common with other exchange digit selectors of the same or other routes has access to a number of junction selectors J for each exchange which is directly connected with the calling exchange, and to a first digit selector 1D for calls to lines connected to the calling exchange. The junction selectors J are provided for the purpose of making more efficient use of junction lines as it is assumed that these will be of such a cost as to justify the provision of this additional equipment. If the cost of providing junction lines is negligible, such as where two exchanges are very near together or where an excess of junction lines between two exchanges has become available, it may prove more convenient to eliminate the junction selectors and connect a junction line to corresponding outlets of each exchange digit selector of each route.

Conveniently the junction selector J is designed to select an idle junction line of a small group and to consist of a number of relays, so as to have more than one junction line accessible from each route, it also may enable certain junction lines to be accessible in common from a number of different routes as described hereinafter with reference to Figs. 13–24.

The first and second and third digit selectors 1D, 2D, 3D are connected in tandem and are made available in common to increasingly larger groups of calling subscribers' lines including lines connected to other exchanges, as the number of such selectors accessible to a particular group of calling lines grows. The finder finals FF are of course available for use for any call wherever originated.

It is assumed that all the digit selectors and finder finals have a capacity of A lines which on a decimal system would be 10, but the capacities of each selector need not necessarily be the same.

Associated with the equipment available to a given group of calling lines ($A^2$ as illustrated) there are a number of impulse responding equipments IR, of which one only is shown. An idle one of these equipments is adapted to be taken into use on the origination of a call over an idle finder FF, an idle second stage finder 2F and over an idle impulse responder finder IRF.

Each impulse responding equipment comprises in addition to the impulse responder finder IRF, an exchange digit responder EDR, a first digit responder 1DR, a second digit responder 2DR, a third digit responder 3DR which are selected and taken into use in the case of local calls to respond to the first, second and third numerical digits, a fourth digit responder 4DR, a second stage finder responder 2FR, and an incoming impulse steering switching device IS and other subsidiary equipment OS. It will be understood that 1DR, 2DR, 3DR in order are each available in common to increasingly larger numbers of impulse responding equipments, such as IR and therefore only form part of IR during the setting up of a particular connection dependent upon it being local to the exchange and the values of the first and second numerical digits.

The arrangement is such that the incoming steering switch IS in turn directs the impulses received from a calling party to EDR, 1DR, 2DR, 3DR and 4DR. 3DR connects up a lead BTFF corresponding to the finder final selected to which lead potentials are applied at instants of the cycle corresponding to those lines of the A lines to which the finder has access if such lines are busy. If the particular line representing the wanted subscriber in said group of A lines is busy then a connection made by 4DR in accordance with the fourth digit is caused jointly with impulses transmitted back from 3DR over lead BTFF to cause a relay (not shown) to be operated in the BF equipment selected by a calling line which results in the release of IR and equipment controlled thereby and in a busy signal being given until the calling subscriber hangs up direct from the BF equipment over the switching devices 2F and FF used in initiating a call from the calling subscriber. If the called line is free, then the equipment IRF which has been previously operated to connect IR to the calling line is again operated over a common test lead CTL to which potential is connected up to indicate which of the routes P$p$–X$x$ are not available. Provision is made in equipment IR to prevent switching devices FF and 2F by which a calling line was connected to IR, being indicated as busy. The route selected therefore depends upon the idle or busy condition of a finder-final when serving as a finder, a busy feed equipment, with second stage finder and exchange digit selector, a first digit selector, a second digit selector, a third digit selector and a finder-final serving as a fourth digit selector. The idle or busy conditions of these devices in the various routes required to set up a given connection are indicated on test leads to common test lead CTL as follows: as regards the first stage finders (finder-final) over the lead JLFD (first stage finder test lead) which is selected by the second stage finder responder 2FR operated over an identifying lead associated with the calling line connected through IRF: as regards the first digit selectors over TL1D, as regards the second digit selector over TL2D, as regards the third digit selectors over TL3D, as regards the fourth digit selectors (finder finals) over TLFF, and as regards the busy feed equipments BF including therewith second stage finders 2F and exchange digit selectors over TLBF. Having discovered an idle route, for instance in the manner described hereinafter, then IRF operates to establish connection between IR and the BF equipment of the selected route and thereupon either control is exerted digit by digit (i. e. from EDR for the exchange digit, from 1DR for the first digit, from 2DR for the second digit, from 3DR for the third digit and from 4DR for the fourth digit) or preferably a switching operation takes place simultaneously over each of the selectors ED, 1D, 2D, 3D from the respective responders EDR, 1DR, 2DR and 3DR which have access to the relays of the selectors which require to be operated. Selector 4D respesented by a finder-final, can then be operated under control of 4DR over the connection thus established. Connection is therefore established to the called line. The identifying leads for the penultimate and final digits of the calling number are arranged if necessary to control the setting of the second stage finder 2F and of the finder final (functioning as a first stage finder of the selected route) to the calling line. Immediately this is effected the function of 1R and its associated equipment is completed and equipment taken into use from it is released as also the finder final and the second stage finder which were originally used in setting up a call if these do not belong to the route selected. The connection between the calling and called line is thus completed and the release of all the equipments is controlled from the battery feed equipment associated with the first digit selector so that when a calling subscriber hangs up all the operated switching devices in the route are released.

In the foregoing description it has been assumed that a local call has been set up. If however, the called line should be located in another exchange than the calling line, instead of the exchange digit responder connecting up test lead TL1D will connect up to a junction test lead TLJ corresponding to the exchange selected by EDR. In this case the selection of an idle route by IRF from CTL will be wholly dependent upon TLJ, TLFF and TLBF. Having determined the route the exchange digit will be transmitted under control of EDR to operate the exchange digit selector ED or possibly the appropriate relay in ED of the selected route operated direct from EDR and thereby to set the BF equipment into connection with an idle junction leading to the exchange required. IR in a suitable manner dependent upon the nature of equipment in the called exchange, will then control the setting up of the connection in the selected exchange and will then be released. For instance, the numerical digits may be stored on a dial repeater whereby, when the equipment in the wanted exchange is seized series of impulses identifying the wanted line and in a form corresponding to that required for operating the equipment in the wanted exchange may be transmitted and in this way it is immaterial whether the called exchange is of the same type as the calling exchange or is of any other type which operates under control of incoming series of impulses.

Referring to Fig. 3 this figure illustrates representative equipment involved in a single route from which (in conjunction with Figs. 1 and 2) the whole of the equipment in an exchange can be readily deduced. By way of example the route $Pp$ is illustrated. In this figure it is assumed that for every $A^2$ (e. g. 100) lines in an exchange there is provided in each route equipment comprising busy feed equipment BF coupled with a second stage finder 2F and an exchange digit selector ED. In addition there is provided common to a number of routes $Pp$ $Pq$, $Px$, a finder final PXFF acting as a finder switch for each A lines. There is also shown an impulse responder IR having associated with it the equipment described with relation to Fig. 1 and including inter alia a second stage finder responder 2FR and an exchange digit responder EDR. The equipment IR however is common to all the routes provided and is linked individually to a group of $A^2$ (e. g. 100) calling lines.

As the exchange digit selector and the exchange digit responder are adapted to respond to A (e. g. 10) impulses, the traffic to each outlet is a fraction of the traffic to the selector responder itself. It is clear that their outlets may be made available to a larger group of subscribers' lines than $A^2$. By way of example, but not by way of limitation, it is assumed that the junction selector $PpJ$ and the first digit selectors $Pp1D$ are available to a group of $A^3$ (i. e. 1,000) calling lines. For convenience only the first and last group of lines of $A^3$ lines are indicated in Fig. 3, namely 1111—1AAA and A111 to AAAA, and it will be noted that the corresponding outlets from ED available from the $A^2$ group of lines 1111—11AA and those available from the $A^2$ lines 1A11—1AAA as well as those available from all intermediate groups of $A^2$ lines are multiplied together both to junction selector $PpJ$ and to first digit selector $Pp1D$. Similarly the corresponding outlets of the exchange digit responders EDR of the impulse responders IR for the various $A^2$ (e. g. 100) line groups of the $A^3$ lines A111—AAAA are also multiplied together.

It will be appreciated that the first digit selector $Pp1D$ which also has A (e. g. 10) outlets can have its outlets available to a still larger group of lines, in this case the capacity of the whole exchange, that is of the whole $A^4$ (e. g. 10,000) lines. This is illustrated in Fig. 3 by representing the first and last 100 line group of the first and last $A^3$ (e. g. 1,000) lines, which outlets from the first-digit selectors $Pp1D$ are multipled in common to the same second-digit selectors $Pp2D$. Similarly the corresponding outlets of the first-digit responders IDR which inter alia determine the idle and busy condition of the second-digit selectors corresponding to the first numerical digit are multipled together as shown. The third digit selectors 3D and the finder finals QP and QF1, which are allocated to the route $Pp$ illustrated are in common with other routes, common to the calling lines of the whole exchange.

The arrangement illustrated is only an example of what can be done because it will be appreciated that while there is for each route one first stage selector for each $A^2$ calling lines there are A second stage selectors available to $A^3$ lines and there are $A^2$ third stage selectors available to $A^4$ lines and $A^3$ finder finals FF functioning as final digit selectors available to $A^5$ lines.

The loading of the routes depends of course upon not only the amount of traffic but also upon the origin and destination of the traffic and a single route $Pp$ as illustrated in Fig. 3 can carry as many as $A^2$ calls terminating in the exchange and $A^2$ outgoing calls and while allowance has to be made for calls having to be dealt with by alternative routes because origin and destination are such as to clash with that of existing calls already set up, it is very unlikely that the same clash will take place for each route so that quite a large percentage of the available calls on each route can be taken up.

Having regard to the small capacity of each selector used it is possible to allow for rather more routes than would normally be allowed for in the known methods of trunking, without approaching the number of switching points required for all the selectors of the exchange. The junction outlets from $PpJ$ of the calling exchange accessible from lines 1111—AAAA are shown multipled together. This should be understood to be purely conventional and actually the connection of the junction lends itself to many variations so that, for instance, some junctions may be individual to each outlet or to the corresponding outlets of a limited number of selectors J while others are available in common to a larger number of selectors J or again as the number of outlets J is intended to be small for each route then these outlets may be multipled as thought desirable with the outlets from other routes.

By referring to Figs. 1, 2 and 3 it will be noted that the lines to be interconnected may be divided into two sets, one of which sets may include lines incoming from subscribers stations alone or together with lines incoming from other exchanges while the other set may include lines outgoing to subscribers stations alone or together with lines outgoing to other exchanges, it being understood that the lines incoming and outgoing to subscribers stations correspond, while unless junction lines are arranged to be two-way the interexchange lines in the two sets are different.

Lines which may serve as incoming lines whether from subscribers' stations or from other exchanges are divided into $A^2$ groups as regards the lines from subscribers stations and AG groups as regards lines from other exchanges. Accessible to each group are a series of finder-selector links $PpBF$—$XxBF$ (Fig. 1) for lines incoming from subscribers stations and P*p*BFJ—X*x*BFJ (Fig. 2) for lines incoming from other exchanges. Access from a finder-selector link to a group of incoming lines is effected over one or more stages of finder switches, e. g. two (primary and secondary finder switches) in the case of incoming calls from subscribers stations and one stage in the case of calls incoming from other exchanges. Each such link accessible to a group of incoming lines may be described as having a different route significance to which the references P*p*—X*x* are applied, while each outlet of each finder switch has a different numerical significance, corresponding to the line or particular number of lines of the group to which it gives access, so that there is only access corresponding to a single route significance from each link through finder switches leading towards a particular group of incoming lines. On the other hand in accordance with the invention selected finder selector links, such as the various links having the same route significance and referred to, as P*p*BF or P*p*BFJ, in Fig. 3, each have access over finder switches P*p*2F, to a different group of said first set of lines, such as the groups of lines 1111—11AA, 1A11—1AAA, A111—A1AA, AA11—AAAA, 111—11G, 1G1—1GG, A11—A1G, AG1—AGG. Consequently there will be a finder switch or switches serving each such different group of said first set of lines which are connected or accessible from a finder-selector link which will have the same route significance as the link to which it is connected or which has access to it. Each finder-selector link moreover has access over selector switches to any one of said second set of lines. Each outlet of a selector switch also has a different numerical significance so that there is only one means of access to a particular line from any link, the selector switches giving access to subscribers lines being arranged as shown in five stages, such as P*p*ED, P*p*1D, P*p*2D, P*p*3D, QPFF to give access to $A^4$ local lines from local lines and in four stages P*p*1DJ, P*p*2DJ, P*p*3DJ, QPFF to give access to $A^4$ local lines from lines incoming from other exchanges, while the selector switches giving access to lines outgoing to other exchanges may be arranged in one or more stages, such as P*p*ED, only one stage being required if there is only one exchange selecting digit as in the arrangement illustrated in Figs. 1 and 3. Corresponding outlets (i. e. those having the same numerical significance) of a selected number, e. g. A, of selected first stage selector switches P*p*ED, P*p*1DJ connected to links having the same route significance of each of a number of series of links allocated to different groups of lines of said first set e. g. 1111—11AA, 1A11—1AAA, or A111—A1AA, AA11—AAAA, or 111—11G, 1G1—1GG, or A11—A1G, AG1—AGG are multipled together and connected to a second stage selector P*p*1D or P*p*1DJ, while selected corresponding outlets of a selected number of selected second stage selector switches P*p*1D, P*p*2DJ, i. e. outlets having a similar numerical significance are also multipled together, thereby giving them the same route as the links of the respective series which give access to them. In other words the various selector links of the different series which have access to different groups of lines of said first set and have outlets of the selector switches to which they give access multipled together, all have the same route significance. Outlets of P*p*1D are common to the links serving all the groups 1111—AAAA. Outlets of P*p*2DJ and P*p*2D are common to all the groups 1111—AAAA and 111—AGG.

The total number of route significances throughout the exchange is therefore at no time greater than the maximum number of finder-selector links in a series which give access to a group (e. g. $A^2$) of said first set of lines, that is to say the total number of route significances throughout the exchange can be represented by the references P*p*—X*x*. Furthermore finder-final switches which serve either as finders or last stage selectors, the traffic over which is comparatively light in that they only give access to a restricted number of lines, e. g. A lines, may have more than one route significance if the density of traffic to such lines permits. For instance PXFF has the route significances P*p*, P*q*, P*x*, when acting as a last stage selector. It will thus be seen that each switch in the exchange has both a numerical and route significance which is distinctive for that switch, the route significance being derived from the finder-selector link or links which have access to it. The numerical significance of a primary finder switch is indicative of the group of A incoming lines to which it gives access, the numerical significance of the secondary finder switch being indicative of the group of $A^2$ incoming lines to which it gives access, while the numerical significance of a selector switch depends upon the stage in which it is located; in the last stage it is indicative of the outgoing group of lines to which it gives access; in the first stage it is indicative for each succeeding stage of a diminishing number of groups of outgoing lines to which it gives access and to an increasing number of groups of incoming lines which it gives access to.

The whole of the switches in an exchange having the same route significance are herein referred to as a route which may be conveniently given the same reference as the route significance of the switches comprising the route, so that a route represents the switching means provided to enable a single connection to be set up between any line of the said first set of lines to any line of said second set.

Figure 10:
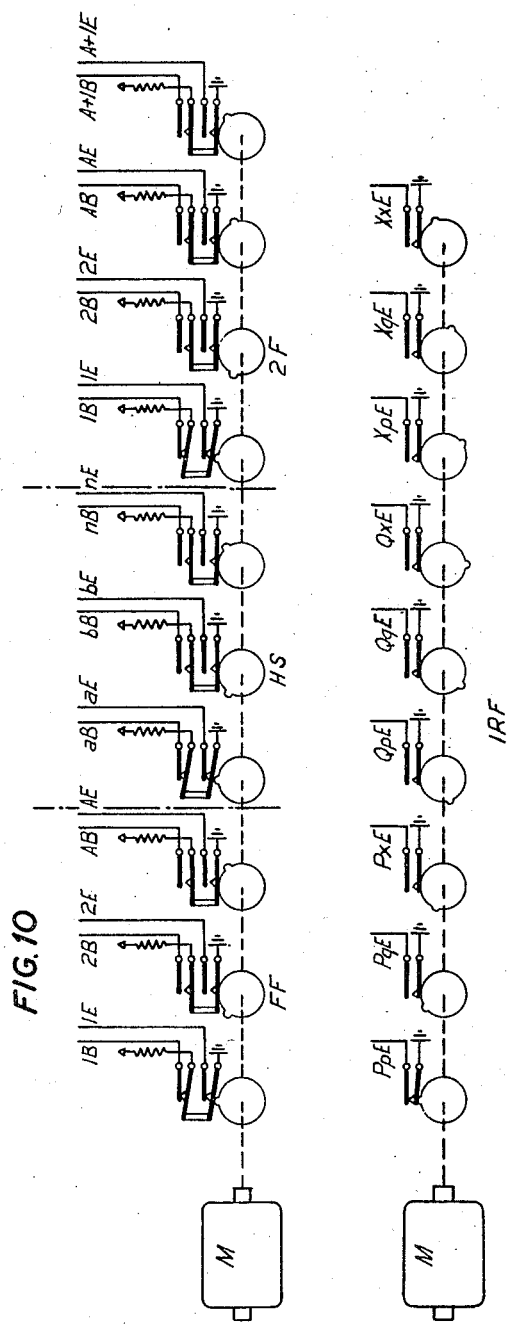
Figure 10 illustrates a method of generating cyclic impulses suitable for the various operations described in connection with Figures 4–9.

Fig. 10 shows a number of cyclic impulse generators such as are suitable for use in conjunction with the equipment described with reference to Figs. 1–12.

For the control of finder finals the cams FF comprising discs with staggered projections are used, mounted on a shaft driven by a motor M and in which three instants only in a cycle are represented, 1, 2 and A. If the capacity of the finder final is 10, then 10 cams would be provided spaced round the periphery of the discs. It will be noted that the left hand cam of FF is shown operating the contact springs associated therewith so that lead 1B is connected to battery through a guarding resistance and lead 1E is connected to earth. The instant this takes place is referred to herein as instant 1 in the cycle. The middle cam which would be operated at the next instant in the cycle, namely instant 2 would at that instant connect battery through resistance to lead 2B and earth to lead 2E. Similarly at other instants in the cycle, so that at instant A battery is connected to lead AB and earth to lead AE. Preferably although not as shown the cams would be arranged equally spaced round the periphery of the discs at different angular positions so that there would be a minimum of waste time between the connection established at one instant, and those established at the next instant. These leads 1B, 1E, 2B, 2E, AB and AE are shown illustrated in Fig. 4. Additional contact springs may be provided or the leads 1B, 1E, etc. might be connected through a number of rectifiers to various control points, as it is important that the same cycle and the same instant in the cycle should be used for all finder final equipment throughout the exchange or at any rate, for those which may be controlled by the same impulse responders.

The cams HS are provided for controlling various hunting circuits which are to be found in Figs. 4–9. While only one set of cams is shown it might well prove desirable for different sets of cams to be provided, because each hunting device may vary in capacity, that is to say the number of cams to be provided would be in accordance with the hunting operations in particular positions. It will be noted that by means of these cams, battery is connected to leads *a*B, *b*B, *n*B at instants *a*, *b* and *n* respectively in a cycle while earth is connected to leads *a*E, *b*E, *n*E, also at instants *a*, *b*, *n*, in a cycle respectively. Referring to Figs. 4–9 it will be noted that these references *a*, *b*, *n*, apply to junction hunter P*p*J1 shown in Fig. 6, the dial repeater hunter JDRH shown in Fig. 9, and also in Fig. 9 to the first digit responder hunter 1DRH.

It will be appreciated that as the circumstances for these various hunting operations are quite distinctive, it would probably be convenient to have quite a number of sets of cams such as HS, dealing with each kind of hunting and possibly dealing with different hunting capacities for the same kind of hunting where the traffic requirements call for it. 2F indicates a set of cams suitable for operation of second-stage-finders. This is similar to those for the finder-final except that provision is made for one additional cam by which battery is placed on a lead (A+1)B at instant A+1 in a cycle and earth on lead A+1E at the same instant A+1 in a cycle. As will be noted from the description of the circuits in Figs. 4–9, the leads associated with 2F marked 1E, 1B, 2E, 2B, AE, AB are used for purposes of operating the second-stage-finder 2F while the leads A+1E, A+1B are used for breakdown and switch through purposes. This enables a single lead to be used for different purposes and so reduces the number of contacts required on the relays constituting the impulse responder finder.

The cams referred to as IRF are used for controlling the operation of the impulse responder finders IRF and for operating the various digit selectors other than the finder final. In this case there are no battery-connected leads but only earth-connected leads, earth being connected to lead PpE at instant Pp in a cycle, to lead PqE at instant Pq in a cycle and so on successively until earth is connected to lead XxE at instant Xx in a cycle. This is followed immediately after by the connection of earth to lead PpE at the first instant Pp of the next cycle. In view of the operations which have to be performed during the particular instant, it may be desirable that the motor driving the cams IRF should be operating at a less speed than the motor driving the cams FF, HS and 2F. The desired speed of the motor or motors will of course depend in the case of any of the sets of cams upon the operating time of the equipment controlled thereby leaving a suitable margin in order to be sure that the operations controlled over the respective leads will be effective.

One or more of the leads PpE to PxE will be found in Figs. 1–9. The leads shown in these figures are not identical but all have the same characteristic that earth is applied thereto at an instant in a cycle represented by the prefix Pp—Xx in their reference. As previously mentioned each lead may be connected to the correspondingly named lead in Fig. 10 via a unidirectional resistor or its equivalent or separate contact devices may be operated by each cam for controlling the application of potential at the appropriate instants to the respective leads.

Figure 11:
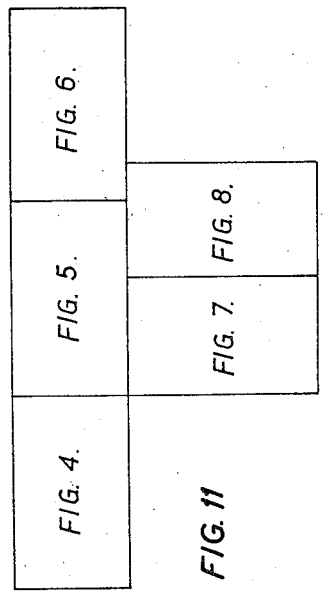
Figure 11 illustrates the arrangement of figures to illustrate the setting up of a call originated locally.

Fig. 11 shows how the drawings are arranged for selection of an idle junction line.

A description will now be given of the equipment required to set up a connection to an idle junction line leading to another exchange over a single route as regards the apparatus in a single exchange. The equipment described is that belonging to the route Pp with a finder-final common to route Pp, Pq, Px, when acting as a first stage finder and the routes, Xp, Xq, Xx when acting as a final or fourth digit selector and with a second finder final acting as a final selector for routes Pp, Pq, Px, and as a finder for routes Qp, Qq, Qx as will be appreciated by reference to Fig. 1.

Figure 4:
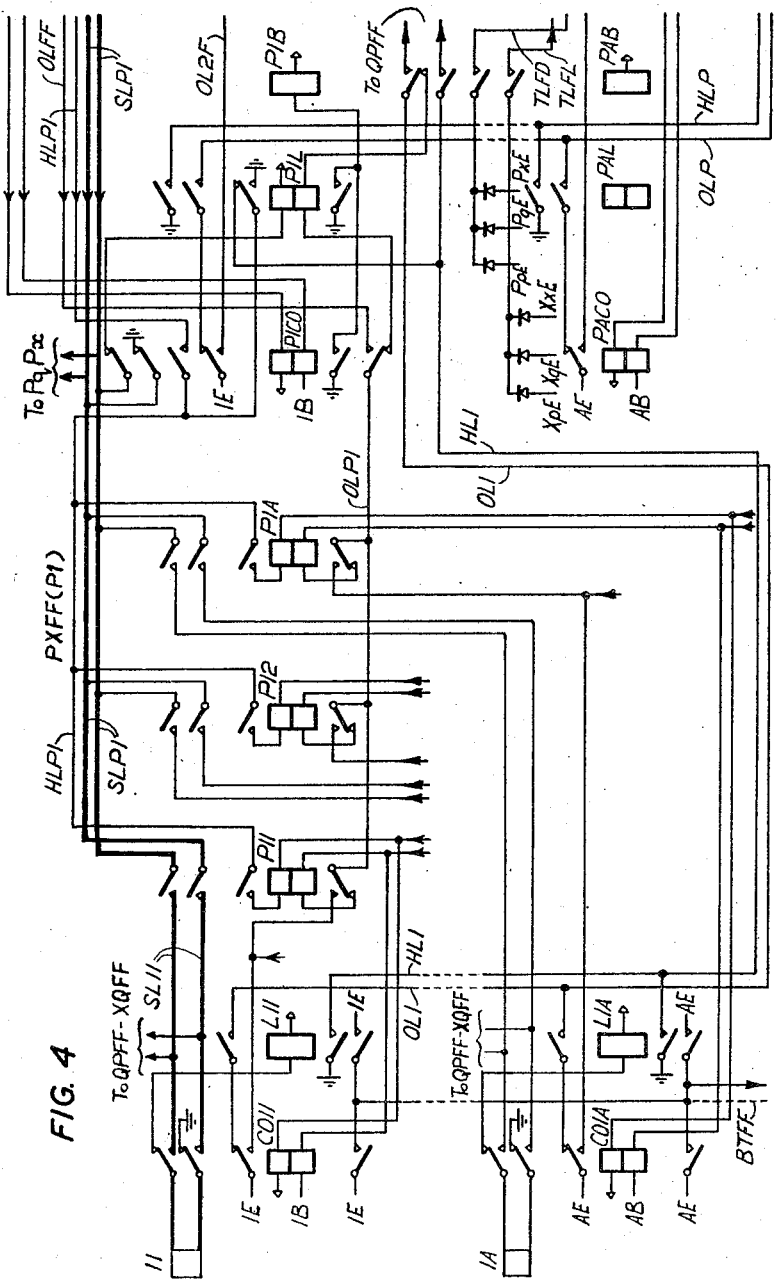
Figures 4–9 illustrate the equipment required to set up a call over a single route to an idle junction line.

In Fig. 4 references 1B, 1E, 2B, 2E, AB, AE indicate leads to which battery or earth (according as to whether the references include B or E) is connected at an instant in a cycle indicated by the prefixes 1, 2, A as described in connection with Fig. 10.

A description will now be given of a call originating over a line having the last two digits 11 to an idle line of a group of lines leading to a distant exchange represented by the digit 1. When the subscriber lifts his receiver, a circuit is completed for line relay L11 which operates and prepares a circuit from lead 1E, back contact of cut-off relay CO11 to lead OL1. It also connects earth to lead HL1. The leads OL1 and HL1 are common to a set of A calling lines having all but the final digit the same. To each A subscribers lines there are provided a number of finder-finals PXFF, QPFF, XQFF (see Fig. 1) adapted to serve as first stage finders for the calling lines in question. Each of such finder finals is allocated to a number of routes, PXFF being allocated to the routes Pp, Pq, Px. Leads OL1 and HL1 are connected to contacts of busy relay P1B associated with a finder final PXFF of routes Pp, Pq, Px and having access to a group of lines whose penultimate digit is 1, but if this finder final is busy they are extended to another corresponding finder final QPFF assigned to another set of routes (Qp, Qq, Qx) and if QPFF is busy to XQFF and so on if there are more than three finder finals. It may be assumed that PXFF is idle, hence OL1 will be extended over back contact of P1B, lower winding of P1L, back contact of P1CO to lead OLP1, which in turn is connected via a number of parallel circuits through the lower windings of all the numerical relays P11, P12, P1A, forming the finder final PXFF, which as it belongs to route P and penultimate digit 1 may be referred to as P1, and of their respectively associated cut-off relays to leads 1B—AB respectively. For understanding of the circuits, the substation having the last two digits 1A of the same group as subscriber 11 and its associated line equipment L1A and CO1A is illustrated. At instant 1 in the cycle due to the operation of relay L11, a circuit is completed as follows: from earth, lead 1E, back contact of CO11, front contact of LO11, lead OL1 back contact of relay P1B, lower winding of P1L, back contact of P1CO, lead OLP1, back contact and lower winding of relay P11, lower winding of relay CO11 to battery on lead 1B. In this circuit relays CO11 and P11 immediately operate and P1L which is slightly sluggish shortly after. Relay CO11 and P11 lock operated through their upper windings in series locking, contact of P11, hold lead HLP1, back contact of relay P1L to earth on lead HL1. When relay P1L energises, it replaces the earth on lead HL1 by a direct earth. CO11 on energising not only disconnects relay L11 to allow it to release, but extends the calling line in conjunction with relay P11 over leads SL11 and SLP1 back contacts of P1CO to earth and battery through the upper winding of relay P1L. Relay P1L when operated is therefore maintained energised direct from the calling sub-station. As soon as P1L energises, it completes a circuit for relay P1B which thereupon extends leads OL1 and HL1 to QPFF to enable the finder final QPFF to be taken into use if free for the next call which is initiated from the group of lines 11—1A. Relay P1L now initiates the operation of the second stage finder illustrated in Fig. 5. It will be noted that if either of the relays CO11 and L11 is operated, the lead 1E is connected to a test lead BTFF which indicates the busy or idle condition of any of the lines of the group to which lines 11 and 1A belong (i. e. those having the same digits up to the penultimate). Each of the lines of the group when busy connects up to line BTFF, a lead to which earth is connected at an instant in the cycle corresponding to that line. For instance, the lead AE is connected up to BTFF when line 1A is busy. Relay P1B similarly indicates when the finder final P1 is busy and in this connection it connects up to a conductor TLFD which indicates the idle and busy condition of the group of finder finals having access to the lines 11—1A to prevent the finder final P1 being seized as a finder switch for any of the routes Pp, Pq, Px to which P1 gives access. One way of doing this is to connect leads PpE, PqE, PxE (i. e. the routes to which P1 is common) and collectively represented by PE in Fig. 1, through rectifiers and front contact of P1B to lead TLFD. P1B in a similar way marks the finder final P1 busy as a final switch to the routes Xp, Xq, Xx on the lead TLFL which is common to all the finder finals having access as fourth digit selectors to the group of lines 11—1A.

Figure 5:
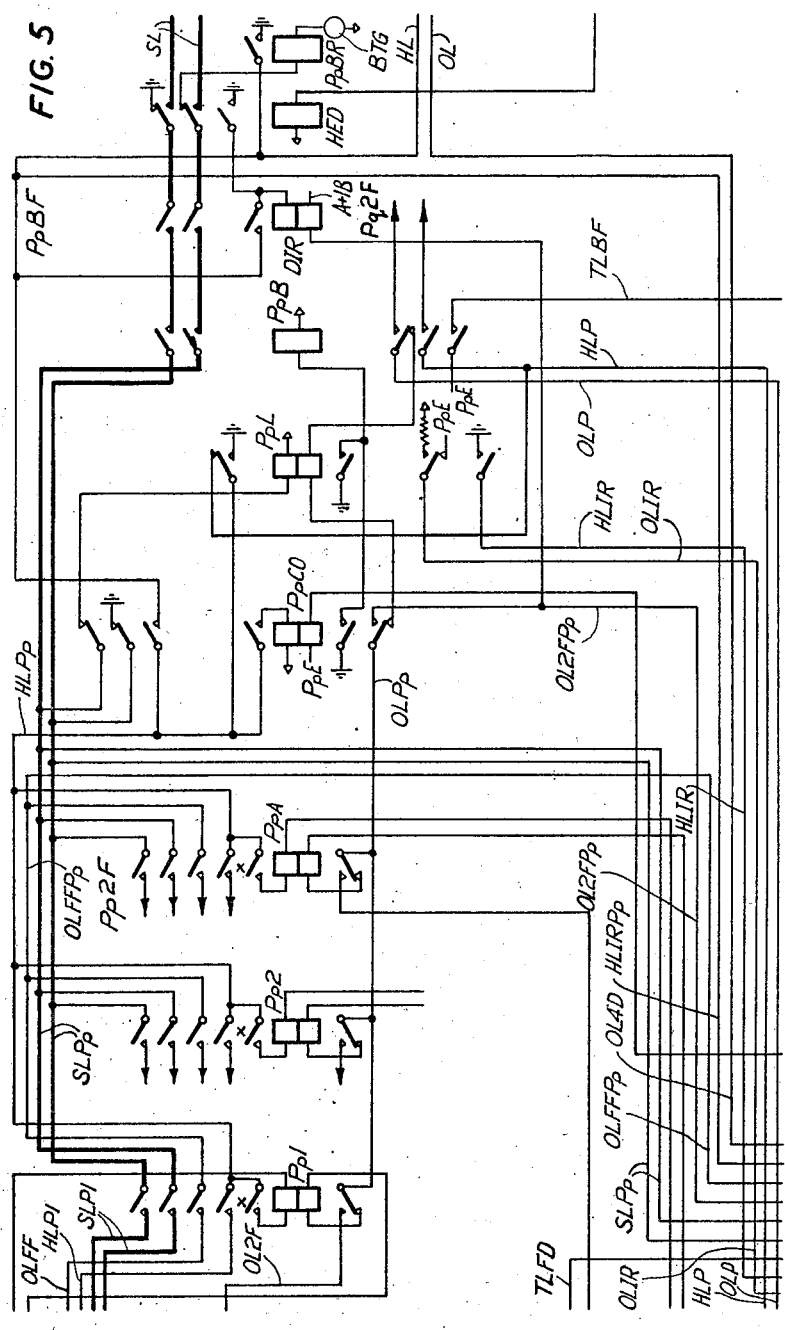
Figure 6:
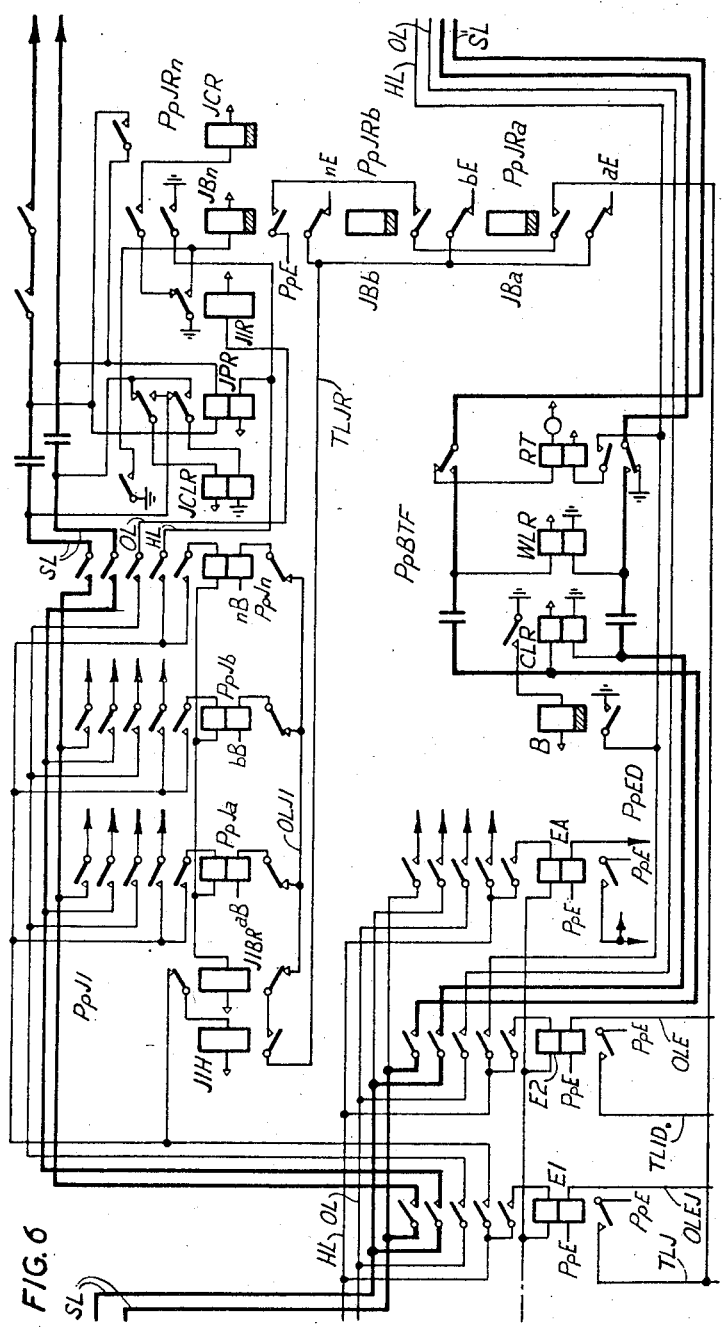

When relay P1L energises, in addition to the operations above described, it connects lead 1E from the back contact of P1CO and its own front contact to lead OLP, it also connects earth to lead HLP. Referring to Fig. 5 it will be noted that OLP is connected over a back contact of relay PpB, lower winding of relay PpL, back contact of relay PpCO to lead OLPp and thence via back contacts and lower windings of relays Pp1, Pp2, PpA to the lower windings of the cut-off relays associated respectively with such relays to conductors 1B, 2B, AB respectively, including P1CO and lead 1B. Consequently at instant 1 in the cycle a circuit is completed for the lower windings of relays PpL, Pp1 and P1CO. In this circuit, relays Pp1 and P1CO operate immediately and lock energised through their upper windings, locking contact of relay Pp1, lead HLPp, back contact of relay of PpL to earth placed on lead HLP by relay P1L. When relay PpL energises it substitutes a direct earth for the earth on HLP. Relay P1CO opens the circuit of relay P1L which deenergises while relay Pp1 connects up the calling substation over leads SL11, SLP1, SLPp to earth and battery through the upper winding of PpL respectively on the back contacts of relay PpCO. Relay PpL is therefore maintained energised directly from the calling sub-station 11 and supplies earth to HLPp, HLP1, to maintain relays CO11, P11, P1CO, Pp1 energised. Relay P1CO completes an alternative circuit for relay P1B to keep relay P1B energised after P1L releases while operate lead OLFF for the finder final which is connected to OLP1 by P1CO is extended by Pp1 to lead OLFFPp, from which it extends to contacts of impulse responder finders and serves to convey to a selected impulse responder the identity of the calling sub-station due to conductor 1E being connected thereto through the front contacts of relay CO11 and P11.

The call is now extended to equipment PpBF from which a busy tone may be fed if necessary to a calling substation.

Operation of relay PpL initiates the operation of selecting an idle impulse responder by disconnecting lead PpE from the operate lead OLIR and connecting thereto battery through a guarding resistance. Relay PpL also connects earth to lead HLIR. These leads extend from Fig. 5 to Fig. 7 where an impulse responder finder is illustrated, represented by the relays Ppa, Pqa, Xxa, which relays are intended as representative of the whole of the routes over which a connection can be set up in an exchange. It is felt that the showing of three will be sufficient to illustrate the principles of the invention. It will be noted that the leads OLIR and HLIR extend to the contacts of relay Ba and according as to whether the impulse responder IRa is busy or idle, so the circuit will be extended to the next impulse responder IRb. Assuming that IRa is idle then the lead OLIR will extend over two successive back contacts in series of Ba to operate lead OLIRa, and Xxa, lower winding of their respective associated cut-off relays such as PpCO to leads PpE, PqE, XxE respectively. At the instant Pp a circuit is completed for relays Ppa and PpCO which energize and lock energized as follows—PpCO locks energized through its locking contact direct to earth supplied originally through a front contact of PpL and subsequently from earth on HLIR via lead HLIRPp, operated contact of Ppa, back contact of relay Ba. Relay Ppa on the other hand locks energized through its lower winding and locking contact and lower winding of relay Pa to earth on lead HLIR via HLa and another back contact of relay Ba. In this circuit relay Pa operates for a purpose to be described later. Ppa connects up leads SLPp to line relay Aa which is thereby connected in the circuit previously described to sub-station 11. Relay Aa accordingly operates and completes a circuit from earth on the back contacts of relays OSa and BDa for relay Ba. Relay Ba energises and disconnects leads OLIR and HLIR and extends these leads respectively to impulse reponder IRb and at the same time connects up a holding earth to maintain operated those relays which were previously locked operated due to earth on HLIR. It also prepares fresh operating circuit for connection to lead OLIRa. PpCO extends OLPp to lead OL2FPp and Ppa extends OL2FPp to lead OL2Fa in the selected impulse responder whereby the connection of lead 1E by P1CO to lead OL2F is extended to Pp1 to lead OLPp and serves to give an indication of the penultimate digit of the calling party (in this case 1). Relay Ppa also connects up, in addition to the speaking leads SLPp already referred to, and the lead OL2FPp for identifying the penultimate digit to which the second stage finder Pp2F responded, the lead OLFFPp for identifying the final digit of the calling line (in this case 1) to which the finder final responded and the lead HLIRPp already referred to by which earth from operated contact of relay Ba is fed to maintain energized the operated relays CO11, P11, P1CO, P1B, Pp1, PpCO. Ppa also connects up lead OL4Da to lead OL4D which is eventually required for operating selectors in the selected route in this case the fourth digit selector as will be explained later.

Dial tone can now be transmitted to the calling subscriber in the usual way (not shown) via the windings of relay Aa which is cut off when the first series of impulses is dialed. The calling subscriber commences to dial and in doing so, on the first impulse releases Aa whereupon a circuit is completed for relay Ca as follows:

Earth, back contacts of OSa, BDa and Aa, front contact of Ba, on the one hand to relay Ca and battery and on the other hand via lead 1La, back contact of junction relay JCO (Fig. 9), lead 1LL, back contact of relay ISE, lead ILE, back contacts of relays IDCO, ERA, ER2, ER1, lower winding of relay ER1 to battery. Relay ER1 partially operates and closes its "X" contact and on the completion of the operation operates fully from earth on lead HLa back contact of ER2, windings of E1 in series to battery. In a similar way ER2 operates in response to the next impulse.

On the assumption that the call being described is an interexchange call and that 1 represents the distant exchange, at the end of the first series of impulses ER1 will remain operated. Consequently on the first series of impulses relay ER1 (Fig. 9) operates and locks operated through both windings in series and its "X" contact to the hold lead HLa. ISE operates on the termination of the first series of impulses representing the exchange digit and completes a circuit as follows: From test lead TLDR (which is marked in accordance with idle or busy condition of a number of dial repeaters such as DRn) front contact of ISE, front contact ER1, back contact of JCO, to operate lead OLDR whence connections are made to leads aB, bB, nB through back contacts and lower windings respectively of relays Ja, Jb, Jn. If it is assumed that the next idle dial repeater to be available is DRn then earth will be connected to TLDR from lead nE at instant n in a cycle through back contacts of hold relay HR and relay BY of dial repeater and thence via the circuit described through to lead OLDR, back contact and lower winding of relay Jn to lead nB to which battery is connected at instant n so that in this circuit relay Jn operates and locks operated in series with relay JCO. At the same time Jn switches through the leads DR1L, DR0L, DRS and DRHL to the dial repeater and lock operates to HLa. Relay JCO on operating disconnects OLDR so as to prevent any of the other relays Ja to Jb being operated if the corresponding dial repeaters are free, and at the same time opens the impulse circuit from 1La and connects it up to lead DR1L whereby subsequent impulses dialled by the calling subscriber are fed into the dial repeater DRn. In the dial repeater, HR operates in response to earth on DRHL. Relay HR closes a circuit for relay IP. IP energizes and opens a point in the circuit of TRM.

When ISE and ER1 operated a circuit was completed for relay IRT from earth, operated contacts of ER1 and ISE, upper winding of relay IRT to battery. IRT operates and completes a circuit from battery and guard resistance, front contact of IRT, back contact of SS to lead CTL and thence via relay STa, front contact of relay Ba, lead OLIRa and thence via upper windings of relays Ppa, Pqa, Xxa, etc. to lower windings of associated cut off relays such as PpCO to leads PpE, PqE, XxE etc. respectively.

CTL is connected as previously described to leads TLFFC and TLBF by which earth is applied to CTL through a rectifier at instants corresponding to each finder-final and BF equipment having access to the calling line which is busy. As before relays BFO and FFO ensure that the finder-final and BF equipment over which the impulse responder IRa was seized are not rendered unavailable.

CTL is also connected via lead TL1D+J and front contact of ER1 to TLJ which is marked with earth corresponding to instants in a cycle assigned to outlets of exchange digit selectors which have no availability to an idle junction line leading to exchange 1, for instance if E1 is energised in PpED it connects leads PpE to TLJ while lead PpE is also connected to TLJ if all the outlets of PpJ1, namely PpJRa, PpJRb and PpJRn (PpJRn only is shown in full) are all busy. This connection may be traced from PpE, front contact of JBn, front contact of JBb, front contact of JBa, to TLJ. As TLJ is connected not only to relays E1 associated with each route but also to a number of relays such as E1 in routes assigned to a number of groups of calling lines it will be clear that if any relay, such as E1 is operated TLJ must be marked busy at instant Pp in the cycle. Also if all the junction repeaters such as PpJRa, PpJRb, PpJRn accessible to a group still larger of calling lines are all busy then earth must be connected to TJ at an instant in a cycle corresponding to the route to which said junction repeaters are assigned.

If one assumes that route Pp is available then a circuit will be completed at instant Pp for relay STa in series with Ppa and PpCO. As the latter relays are already operated STa alone operates and connects battery to STL to complete a circuit via operated contact of ER1 to lead OLEJ and thence as STa is operated only at instant Pp to lower winding E1 in PpED and earth on lead PpE. E1 operates and locks operated to earth on lead HL and extends HL, OL, SL, to PpJ1. Earth on HL causes J1H to operate and complete a circuit from TLJR to OLJ1. TLJR is marked in accordance with the idle or busy conditions of the junction repeaters such as PpJRn to which PpJ1 has access; for instance if PpJRn is idle lead nE is connected to TLJR through back contact of relay JBn, similarly leads bE and aE are connected to TLJR through back contacts of relays JBb, JBa if the corresponding junction repeaters to which these relays belong are respectively idle. OLJ1 on the other hand is connected through back contacts and lower windings of relays PpJa, PpJb PpJn to leads aB, bB and nB respectively. If n is the next instant after the operation of J1H that a junction repeater is available, a circuit will be completed for PpJn which energises and locks in series with J1BR. J1BR opens the circuit of J1H which releases and also disconnects TLJR from OLJ1. PpJn in addition to locking on to lead HL extends HL, OL, SL to the selected junction repeater PpJRn.

The selector junction repeater comprises a line relay JCLR for feeding battery to the calling line when impulsing is completed. A polarised relay JPR which is normally polarised but not energised by earth fed over HL and is adapted to be energised when current fed from the distant exchange is reversed to that normally on the line. The second winding of JPR which responds to this current also acts to provide a circuit for the line relay at the distant exchange. Lead OL is connected to an impulse relay JIR which is normally energised over the following circuit: earth on impulsing springs IPC of the dial repeater DRn (Fig. 9), lead DROL, operated contact of Jn, lead DROL, which joins OL4Da and thence via operated contact of Ppa to lead OL4D (Fig. 5) lead OL (Fig. 6) operated contacts of E1 and PpJn to relay JIR and battery. Relay JIR accordingly energises and with JBn completes a circuit over the junction line JL for the line relay at the distant exchange in series with the upper windings of JPR, completes a circuit for relay JBn which energises and places another earth on the hold lead HL and also prepares a circuit for relay JCR. It also opens the circuit from lead nE to TLJR so as to render PJRn unavailable to other calls and closes one point in the circuit from lead PpE which is extended to TLJ when the remaining relays such as PpJRa, PpJRb are operated.

It will be appreciated that this operation takes place in a very short interval of time and in the meanwhile the dial repeater DRn may have been responding to the first series of impulses transmitted over 1La, front contact of JCO, front contact of Jn to lead DRIL and thence to the stepping magnet RCM of the dial repeater and relay C in parallel to battery. The dial repeater diagrammatically illustrated corresponds to that described in detail in British patent specification No. 458,095 although it will be understood that with proper modifications other forms of regenerative impulse repeaters may be employed. All that is necessary is to provide an equipment which will receive impulses and retransmit them after a suitable or controlled delay, preferably the retransmitted impulses are corrected both as regards speed and make and break ratio.

In the dial repeater described, the transmission does not take place until the first digit is completely received. That is to say, in response to the first series of impulses RCM operates and stops a ratchet wheel R a number of steps in accordance with the number of impulses in the series being received and gives additional tension to the spring by which it is coupled to the transmitting dial T. Relay C which operates in parallel with RCM closes a circuit for marking magnet MKM from earth *mkm*, and at the end of the first series of impulses when relay C releases MKM is de-energised and in releasing cause a pin in pin-carrying member F (corresponding to the first digit dialled) to be moved into the path of a pin carried by a disc wheel T. Disc T is prevented from rotating because it is held by a pin head displaced in F (by the last call). When magnet MKM is deenergised at the end of the first series of impulses, it pushes a pin into the path of disc T. Contacts *mkm* which opened when MKM energised now close and as ON springs close when R moves from T, a circuit is completed for BY which locks independent of *mkm*.

A short circuit for the relay IP is made by connecting earth direct to the guarding resistance via off normal contacts ON, pins in wheels F and T, contacts *trm* controlled by transmitting magnet TRM, front contact of BY to the junction point of the guarding resistance and relay IP. IP is slow to release and is made more sluggish by the short circuit but it does eventually release and completes a circuit for TRM as follows: earth, back contact of IP, front contact of BY, TRM to battery. TRM operates and allows magnet T to release disc T from the pin which normally held it in engagement, the short circuit on IP is opened by contacts *trm* and IP again operates to allow TRM to de-energise, TRM has however released T from the last holding pin and permits it to move towards the pin just operated, the movement of T being so controlled that the impulses generated by the intermittent openings of the contacts IPC are of correct speed and make and break ratio.

It will be appreciated that quite a time will elapse before impulses are transmitted and it is anticipated that the seizure of an idle junction repeater will have been effected in that interval. If, however, a longer interval is desired suitable delaying means may be provided in the dial repeater equipment to prevent the transmission taking place before the longest possible time it would take to seize an idle impulse responder has elapsed. Subsequent series of impulses are stored similarly on RCM and retransmitted by IPC. When the last impulse is stored and retransmitted contacts ON open and relay BY releases. The incoming series of impulses successively operated relays IS1, IS2 and IS3 and IS4 as previously described via relay Ca. When the last series of impulses was transmitted IS4 operated and a circuit is then completed as follows: lead A+1E, back contact of relay BY, front contact of IP, lead DRs via operated contact of Jn to operated contact of IS4, upper winding of relay BDa to lead OL2Fa, lead OL2FPb and thence via lower winding of relay D1R to conductor A+1B so that at instant A+1 in a cycle relay DIR is energised and also relay BDa. BDa serves to open the energising circuit for relay Ba which releases shortly after while relay DIR locks energised and completes from the calling line a circuit to JCLR which energises and completes an alternative circuit for relay Bn which feeds earth backwards when earth is removed from hold lead HL and the other hold leads by a relay Ba. A call is thus extended to the distant exchange which may be of any known type, that is to say, one which responds to series of impulses or of the same type as that described. The operation in the latter case will be understood by referring to the description hereinafter of an incoming call.

It is to be noted that if the calling subscriber should hang up before completing the last digit then HR and Jn will release on the removal of holding earth but relay BY will ensure the continued operation of the dial repeater until the off normal springs ON open and permit relay BY to release. Hence lead nE is not connected back to TLDR until both HR and BY release.

The location of junction lines to the various routes is an important part of the present invention and in order that the possibilities of the invention may be better understood reference may be had to Figs. 12–16 which illustrate three distinct routes Pp, Pq, Pr as examples of routes available for a call to a group of junction lines leading to a particular exchange.

Referring to Fig. 22 there is shown a cyclic interrupter by which earth is placed on various leads marked respectively PpE, PqE, PrE, PsE, PtE, QpE, QqE, QrE, QsE, QtE, RpE, RqE, RrE, RsE, RtE, SpE, SqE, SrE, SsE, StE, TpE, TqE, TrE, TsE, TtE, at different distinctive instants in the cycle of revolution of the driving motor. These leads are used for controlling purposes as will be described hereinafter and it should be mentioned that reference will be made herein to earth being placed on a lead at an instant corresponding to its prefix letters that is to say lead PpE is a lead to which earth is connected at instant Pp in a cycle. In this case it is assumed that there are twenty routes available for setting up a connection and each of the routes is given a reference corresponding to the prefix of the leads mentioned Pp—St respectively.

Fig. 23 shows a motor adapted to control successively the operation of a series of contact springs whereby earth and battery are placed on the leads illustrated corresponding to the different outlets of a hunting device. In this case it is assumed that a hunting device has three outlets given by the references a, b and c so that the lead Ab means that battery is connected to lead aB at instant a in the cycle. Similarly aE is a lead to which earth is connected at an instant a in a cycle and so on with the other leads bB, bE, cB, cE. These leads are indicated by these references like leads Pp—St in Figs. 12–16. In both cases it is to be assumed that rectifiers or like devices are provided for the individual leads to prevent potential being fed back from any common lead to which such leads may be connected directly or indirectly.

Figs. 18, 19, 20 and 21 are examples of various sized groups of junction lines and show how they may be allotted to various routes. All lines of a group lead to the same exchange while each group may have access to a different exchange. For instance in Fig. 18 it is assumed that there are fourteen junction lines and each route has one outlet, certain routes sharing a junction line such as Pq and Pr sharing junction No. 2, Pt and Qp sharing junction No. 4, Qr and Qs sharing junction No. 6, Rp and Rq sharing junction No. 8, and Rs and Rt sharing junction No. 10, Sq and Sr sharing junction No. 12. This is a case where the total number of junction lines is less than the total number of routes so that if one route should not be available due to one of the multi-position switching devices in that route being busy it is possible to get access to the same junction line if idle over another route.

Only one outlet may be necessary as in Fig. 18 although clearly more than one outlet can be provided as in Figs. 19, 20 and 21 to give greater accessibility and availability of the junction lines.

It will be understood that there is a common multi-position or non-numerical switching device common to a route giving direct access to the junction lines indicated from a number of groups of calling lines, for instance, if a group of 100 lines has access to an exchange digit multiposition switching device then outlets from 10 such groups of 100 lines will have access to similar exchange digit multiposition switching devices and the outlets of all the multiposition switching devices in the same route of the whole 10 groups of 100 calling lines will be multipled together.

In Fig. 19 it is assumed that there are 30 junction lines and in this case it is necessary to provide at least two outlets for each of the routes, that is to say in each route the outlets of the exchange digit selectors allocated to different groups of calling lines (say 10 groups of 100 calling lines) will have access in common to a hunting device having two outlets referred to as outlet No. 1 and outlet No. 2 respectively. The junction lines are connected to outlets 1 of the various routes Pp to St as illustrated, twenty junction lines one to each route, while the remaining 10 junction lines 21–30 each share a pair of routes. Consequently each group of 100 calling lines has access to the whole 30 junction lines.

Figure 20 shows an arrangement with three outlets and 50 junction lines all of which are accessible to any group of a 100 calling lines in the exchange, for instance, on route Pp each group of 100 lines up to a total of say 10 groups has access in common to a hunting device having three outlets to junction lines numbered 1, 21 and 41 respectively.

On route Pq each group of calling lines up to a total of say 10 groups has access in common to a hunting device having three outlets to junction lines numbered 2, 22, 41, while on route Pr each group of 100 calling lines up to a total of say 10 groups has access in common to a hunting device having three outlets to junction lines numbered 3, 23 and 42 and similarly with the other groups, which would have access to junction lines as set out in the table in Fig. 20.

Figs. 12–16 have been designed on the basis shown in Fig. 20.

In Fig. 21, a grouping arrangement is shown in which there are four outlets enabling 60 junction lines to be dealt with according to which each of the routes have two individual outlets and two outlets which they share with another route. As both Pp and Pq share both outlet 21 and outlet 31 it would probably be found desirable to ensure that P*p* shared those lines which it has to share with two different routes rather than the same route but this is only one of many variants which will be obvious to anyone versed in the art.

The arrangement in Fig. 21 is representative of a case in which the total number of outlets of the non-numerical switching devices is greater than the number of lines in the group leading to another exchange or expensive equipment, in which case in accordance with the invention and as illustrated in Fig. 21, two or more outlets of different non-numerical switches are multipled together.

Figure 12:
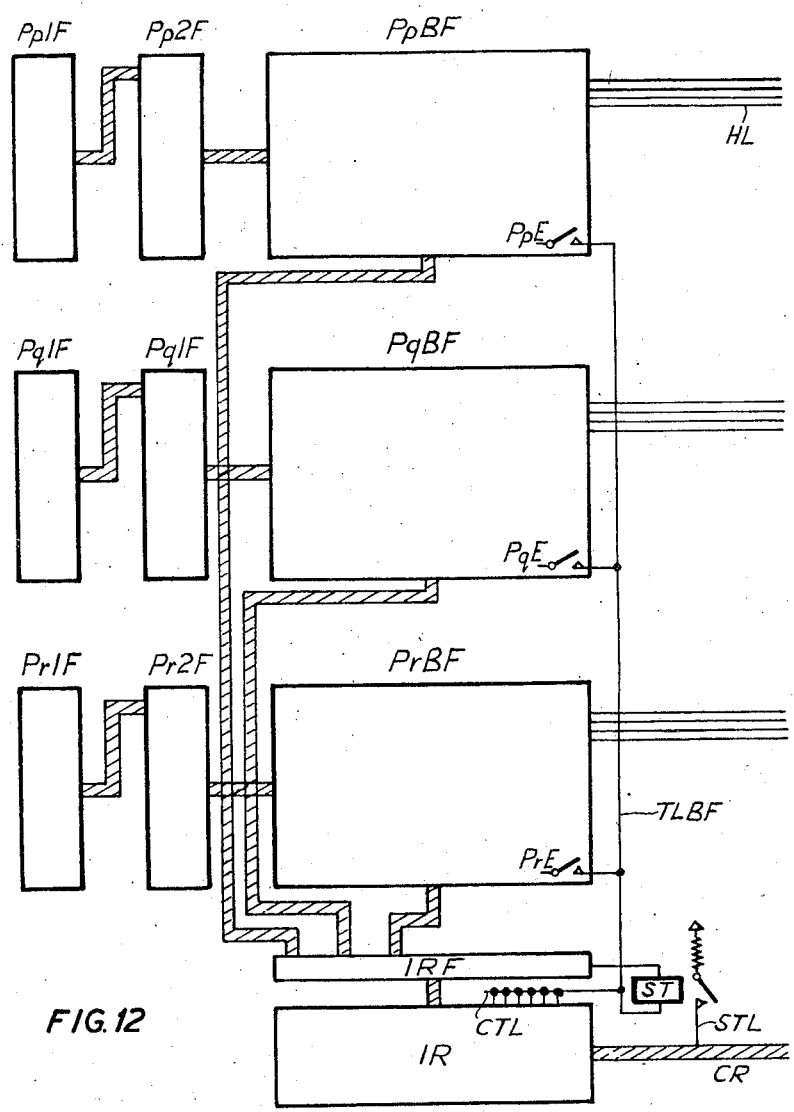
Figure 13:
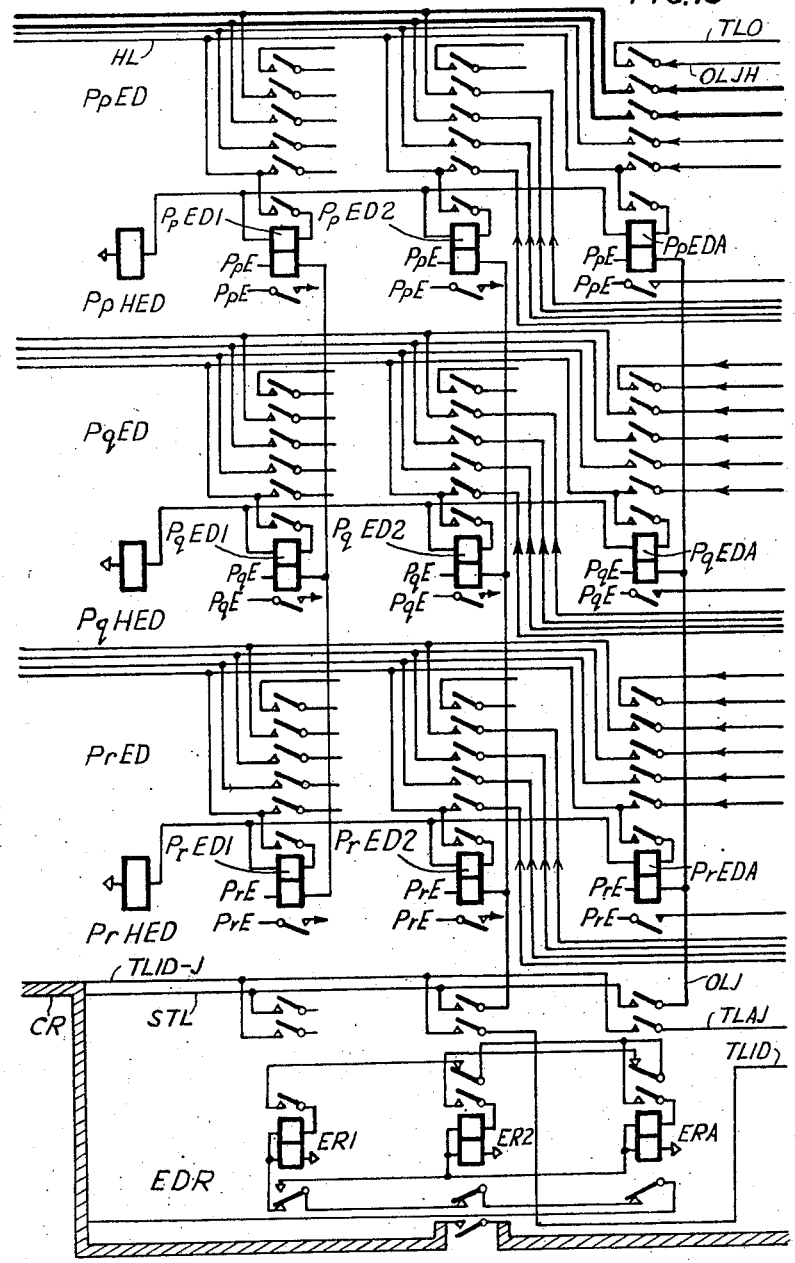

The general layout of Figs. 12–16 is based upon the similar layout illustrated in Figs. 4–9, except that subscribers' lines have been omitted. The equipment is generally illustrated by rectangles (subscribers' lines and line equipment being omitted), for instance when a call is initiated an idle first stage finder such as P*p*1F, P*q*1F P*r*1F is taken into use which in turn causes an idle one of the second stage finders P*p*2F, P*q*2F, P*r*2F respectively to be taken into use. The second stage finders are associated with busy-feed equipment such as P*p*BF, P*q*BF, P*r*BF as illustrated in Fig. 12, and exchange digit selectors P*p*ED, P*q*ED, P*r*ED (Fig. 13). It will be understood that only one group of calling lines and one set of numerical switches per route are illustrated. Other groups of calling lines and other sets of numerical switches similarly arranged are provided in the manner illustrated in Figs. 1 and 3. The latter figure shows how corresponding outlets of a number of numerical switches of the same route but allocated to different groups of calling lines are multipled together. From an equipment BF which is taken into use by a calling line an idle impulse responder such as IR is taken into use over a finder IRF. The impulse responder IR has associated therewith an exchange digit responder EDR consisting of a group of relays ER1, ER2, ERA and it is assumed that each of these relays is associated with a particular exchange, ER2, for instance, being assumed to be associated with the local exchange and ER1 and ERA with distant exchanges. If the call is to a distant exchange an impulse regenerator such as a dial repeater may be automatically taken into use on which the numerical series of impulses are registered and subsequently retransmitted over a selected junction line as previously described. If the call is a local call then certain of a plurality of leads represented by a cable CR are extended to a first digit responder 1DR to enable 1DR to respond to the first numerical digit and thence to 2DR to enable 2DR to respond to the second numerical digit and thence to 3DR to enable 3DR to respond to the third numerical digit. The fourth numerical digit is registered with equipment IR.

As the present application is only concerned with the problem of junction line selection it is only necessary to assume that one of the relays EDR corresponding to a distant exchange is selected and it will be assumed that ERA is operated. When this operation is effected after the completion of dialling, the common test lead CTL associated with the impulse responder finder IRF is made effective to control the operation of IRF for the purpose of selecting an idle route over which a connection can be set up. CTL is connected to a test lead TLBF to which the busy feed equipments such as P*p*BF, P*q*BF, P*r*BF connect up respectively leads P*p*E, P*q*E, P*r*E if they are busy, that is to say, TLBF will be marked with an earth at all instants corresponding to busy feed equipments which have been taken into use by the group of calling lines with which IR is associated. Included in cable CR is a test lead TL1D–J which serves to indicate the idle and busy condition of either the groups of junction lines accessible to the various routes if the call is to a distant exchange when TLAJ is connected to TL1D–J or the busy or idle condition of the first digit selectors of the various routes if the call is a local call when TL1D is connected to TL1D–J. For instance, if ER2 is operated test lead TL1D is connected to TL1D–J whereas if ERA is operated then test lead TLAJ is connected to TL1D–J.

Figure 14:
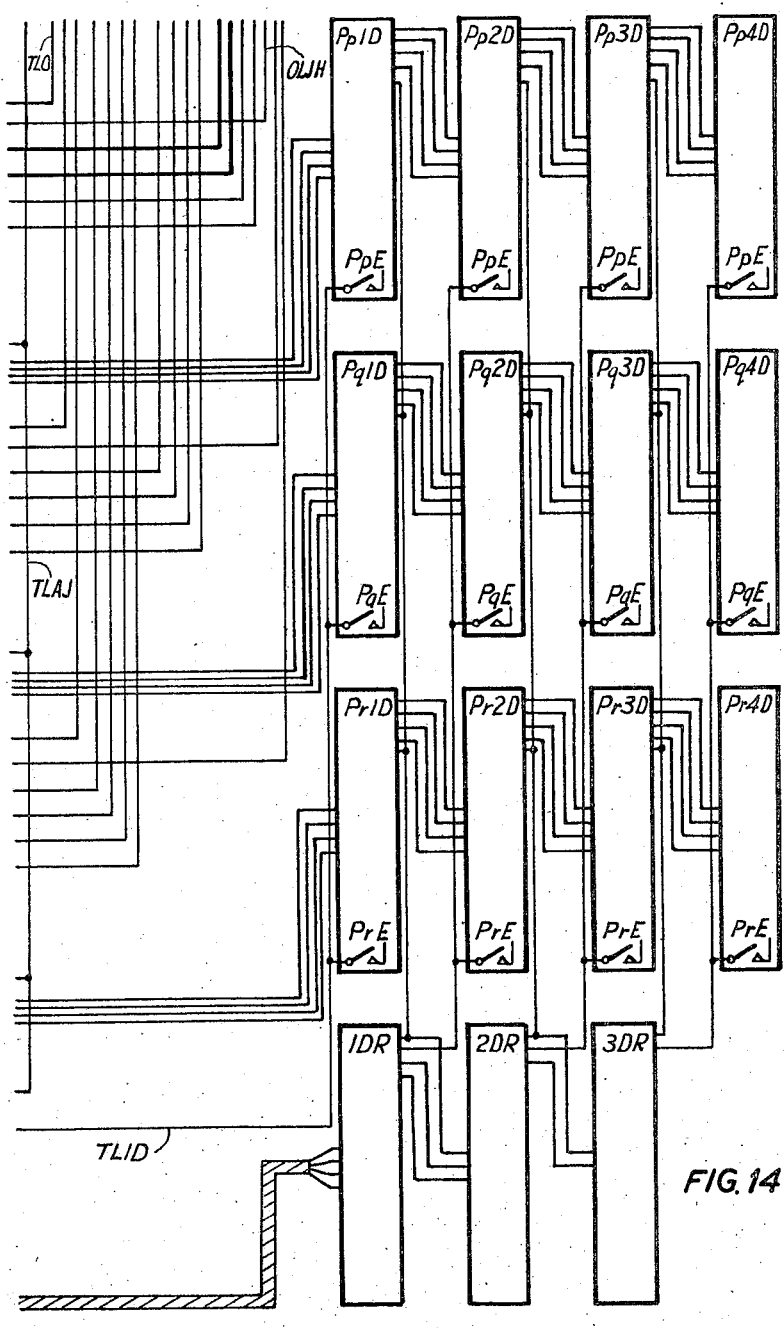

It will be noted that TLAJ is extended from Fig. 13 via Fig. 14 to Fig. 15 and thence to Fig. 16 where it is connected to a number of leads one for each route of which three only are shown. Each of the leads so connected to TLAJ includes a normally open contact of each of a plurality of relays with the prefix designation BR, one such relay being associated with equipment individual to the various junction lines which are accessible from a single junction hunter such as JHP*p*, JHP*q*, JHP*r*. The junction lines illustrated are given the numbers 1, 2, 3, 21, 22, 23, 41, 42 and it will be noted from the table in Fig. 20 that such junction lines are associated with the three routes P*p*, P*q*, P*r* illustrated.

Referring to Fig. 16 it will be noted that relays having prefix reference BR are followed by a number corresponding to the number of the junction line with which they are associated. These relays are adapted to be operated whenever the junction line with which they are associated is busy so that if junction lines 1, 21 and 41 are busy the lead P*p*E will be connected through operated contacts of BR41 BR21 and BR1 respectively to the junction test lead TLAJ to mark this lead with earth at instant P*p* thereby preventing the route P*p* being taken into use by the finder IRF when testing for an idle route. Similarly if junction lines 2, 22 and 41 are busy then the lead P*q*E will be connected through the operated contacts of BR41, BR22, BR2 to TLAJ to prevent route P*q* being taken into use by finder IRF. Similarly if junction lines 3, 23 and 42 are busy then P*r*E will be connected to TLAJ and so on as regards all the groups of junction lines as represented in Fig. 20 for the various routes.

For the sake of example, it will be assumed that there is an idle junction line 21 available and that route P*p* is the first one tested with an idle path for the required connection from the particular calling line to junction 21. As BR21 is not operated there will be no earth connected on TLAJ at instant P*p*. It is also assumed that P*p*BF is idle so that there will be no earth connected to TLBF at instant P*p*. When route testing is initiated battery is connected to CTL over one of the leads from IR and therefore at instant P*p* a circuit is completed to that one of the relays constituting IRF which is also connected to lead P*p*E. Switching relay ST is connected in series with this circuit and on operating connects battery over a conductor STL included in the cable CR and extending over the front contact of ERA to the operate lead OLJ so that a circuit is completed through the lower winding of relay P*p*EDA at the instant P*p*. Relay P*p*EDA locks energised on conductor HL and at its upper contact closes a circuit as follows at instant *b*: earth on conductor *b*E, back contact of relay BR21 (Fig. 16), test lead TLO, front contact of relay P*p*EDA, operate lead OLJH, back contact of junction cut off relay JCO, of junction hunter JHP*p*, lead OLJF, back contact and lower winding of relay JF*b* to battery on conductor *b*B. In this circuit therefore relay JF*b* operates and locks operated to lead HL and extends the connection from BP*p*F over P*p*EDA and JF*b* to the repeater equipment RE21 associated with line 21 so that the connection can be set up over line 21 in the manner described. The thickened lines on this connection represent the speaking leads.

It will be appreciated that if, for instance, relay 41 had been idle and all the other junction lines busy, it would be possible to set up a connection over either of the routes P*p*, P*q* according as to whether the busy feed and other equipment of these routes allocated to the calling group of lines was idle.

It will be understood that other groups of calling lines would have busy feed equipment associated with them and arranged similarly to those illustrated in Fig. 12 from which calls could be set up as described herein. A certain number of such groups of calling lines will share common outlets from the exchange digit selectors connected with them, that is to say, the outlets from P*p*EDA will be common to a number of similar exchange digit selectors associated with other groups of calling lines. Consequently it is necessary to provide an additional test lead which is marked with earth at those instants in a cycle corresponding to the routes in which the outlets to the required exchange of any of the various exchange digit selectors associated with the respective groups of calling lines are busy. The test lead TLAJ is adapted to have earth connected at instant P*p* by any of the relays of the selectors P*p*ED having common outlets. Such connections are established when the corresponding relays P*p*EDA, P*q*EDA, P*r*EDA are operated.

It will be appreciated that the junction lines, on the assumption that there are only 50 as set out in the table of Fig. 20, are available to every group of 100 calling lines in the whole exchange, so that any junction line may be made busy from any of the other groups of calling lines than those for which equipment is illustrated. At the same time, the invention permits the possibility of a single group of calling lines having access to any of the outgoing junction lines by the mere addition of a limited number of relays so that the total number which are held up when a connection is established is only increased by three over and above the case where there is only a single outlet provided, that is to say, if the capacity of the hunting switches JHP*p*, JHP*q*, JHP*r* is X then the number of outlets available to a single group of calling lines may be as much as X times the number of routes provided for setting up calls. Generally speaking, it is considered advisable to provide rather more relays in the junction hunting switches than required to give the total number of junction lines so that a certain amount of multipling between routes can be provided thus reducing the chance of a junction line not being available because the routes over which it can be reached are in use as regards the particular selectors required for other calls, either local or to the other exchanges. It will be understood that a route may be unavailable from a particular group of calling lines owing to BF equipment on such route being busy on a local call or a call to another exchange but may be available from another group of calling lines owing to BF equipment accessible to said group of calling lines and on the same route being disengaged.

It will be clear that the arrangement illustrated in Figs. 12–16 could be readily adapted by those versed in the art to deal with any of the specific examples illustrated in Figs. 18, 19 or 21 and of course to any variant thereof which may be met with in practice.

The arrangement of junction lines and the selection thereof can readily be made use of with appropriate modifications for PBX lines.

The multipling arrangements in accordance with Figs. 18–20 are set out in Fig. 24 in which three routes are represented as in Figs. 12–16 by way of example, namely routes P*p*, P*q*, P*r*. The route references are shown to the left of Fig. 24 and apply to all the switching devices represented by rectangles in the same horizontal row.

The references to the switching devices and busy feed equipments are shown at the top of Fig. 24 and apply to all the devices in the same vertical row with the exception of the elongated rectangles to which the general reference IR is applied. As according to Fig. 1 the routes with the same reference P have only a single primary finder IF or finder final FF, only one is illustrated for each of four groups of calling lines 1111—1A11, 1A11—1AAA, A111—A1AA, AA11—AAAA. The calling lines have the same references as in Fig. 3.

The groups of internal lines to which the calling lines have access and which are connected to inlets of the exchange selector ED are represented by rings with the references 11, 1A, A1, AA, each ring is shown embracing three internal lines. The selecting devices allocated to each group of internal lines are given the reference IR followed by the number of the group e. g. 11, 1A, A1, AA. The testing devices and operating means are given the references ST and OL followed by the group number and are represented by a small rectangle and a line respectively. The full circuits and equipment involved in each operation are illustrated in one form in Figs. 4–9.

The numerical switching devices ED are shown with an outlet having the numerical significance 1 corresponding to one group of interexchange lines going to one exchange, the number in which group is less than the number of routes as set out in Fig. 18, and with an outlet having the numerical significance A corresponding to a group of interexchange lines going to another exchange, the number of lines in which latter group is greater than the number of routes as set out in Fig. 20.

A number of outlets of the same numerical significance are multipled together, for instance the multiples ML1 link outlets of a single numerical switch assigned to each group of internal lines 11, 1A, A1, AA together, but in addition connecting means CM1, which in this case may constitute soldered or other joints with appropriate leads, give these outlets access to interexchange lines 1 and 2.

As set out in Fig. 18, line 1 is assigned to route P*p* but line 2 is common to routes P*q* and P*r*. Hence multiple leads in the case of line 2 are connected to outlets of numerical switches of the same numerical significance but of different routes of the same group as well as to outlets of numerical switches each assigned to a different one of a plurality of groups of internal lines.

The multiple MLA connects outlets of a single numerical switch assigned to each of a number of groups of calling lines together which outlets have the numerical significance A. In this case the number of groups concerned is only a fraction of the total number of groups and two fractions are represented to which the reference MLA is applied. In addition connecting means including a junction hunter or non-numerical switch JH and connecting means CMA serve to give the A outlets of switching devices ED access to interexchange lines 1, 2, 3, 21, 22, 23, 41, 42. Lines 1, 2, 3, 21, 22, 23 are multipled to outlets of a single non-numerical switch JH assigned to each of a plurality of larger groups of lines 1111—1AAA and A111—AAAA, so that every group of internal lines has access to all the lines of a complete group of interexchange lines. Interexchange lines 41 and 42 are connected to outlets of two numerical switches assigned to each of the larger groups of internal lines 1111—1AAA and A111—AAAA, that is 41 is assigned to routes P*p* and P*q* and 42 is assigned to routes P*r* and P*s* (not shown).

It will be readily appreciated how the multiple connections can be completed as regards the remaining routes in accordance with Figs. 18 and 20 and also how the arrangements of Figs. 19 and 21 can be worked out as also to any other modifications of sizes and arrangements of groups of interexchange lines.

Figure 7:
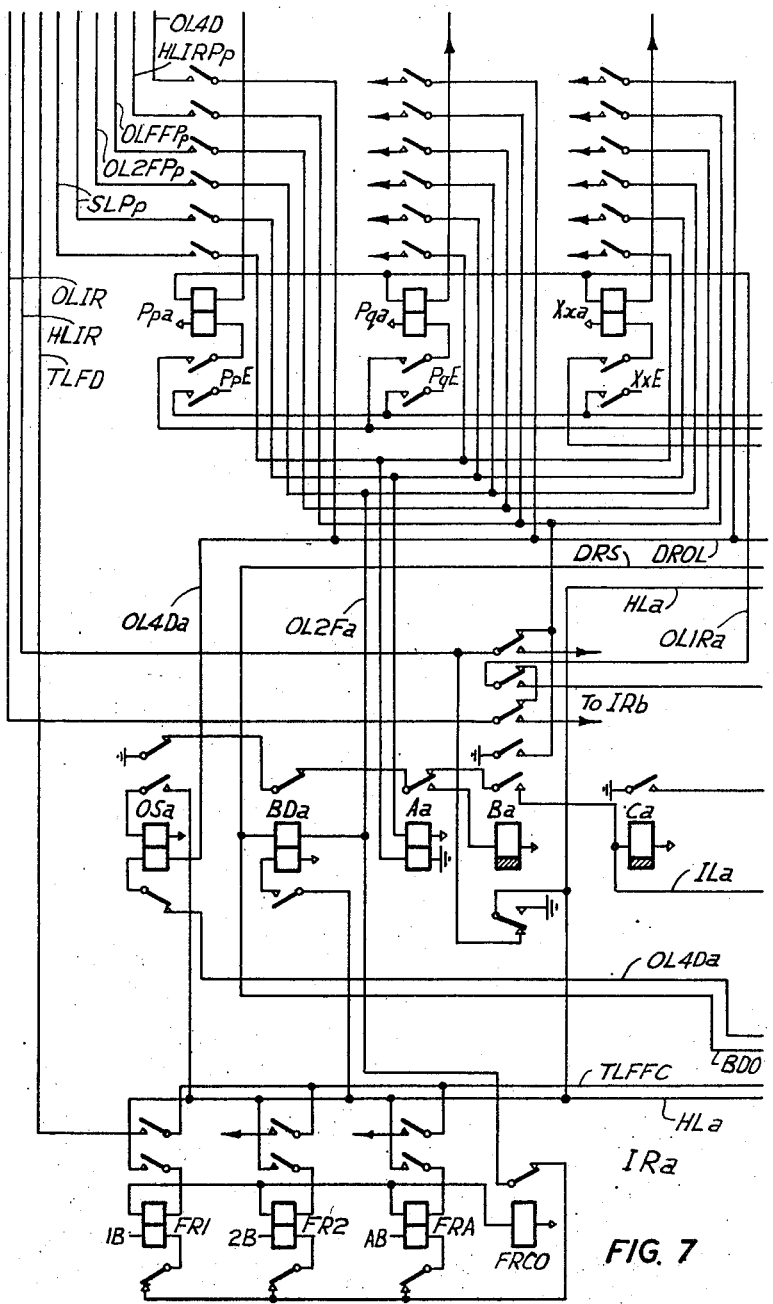
Figure 8:
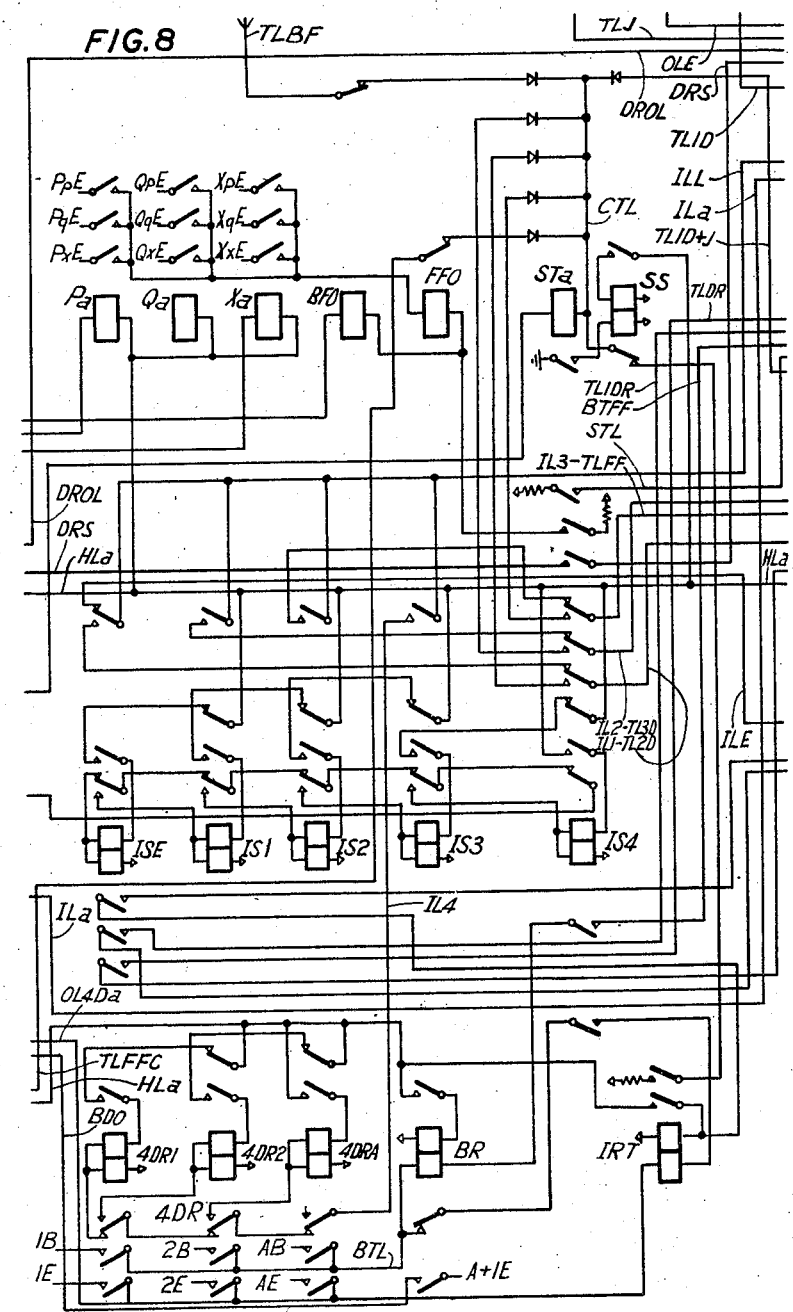
Figure 9:
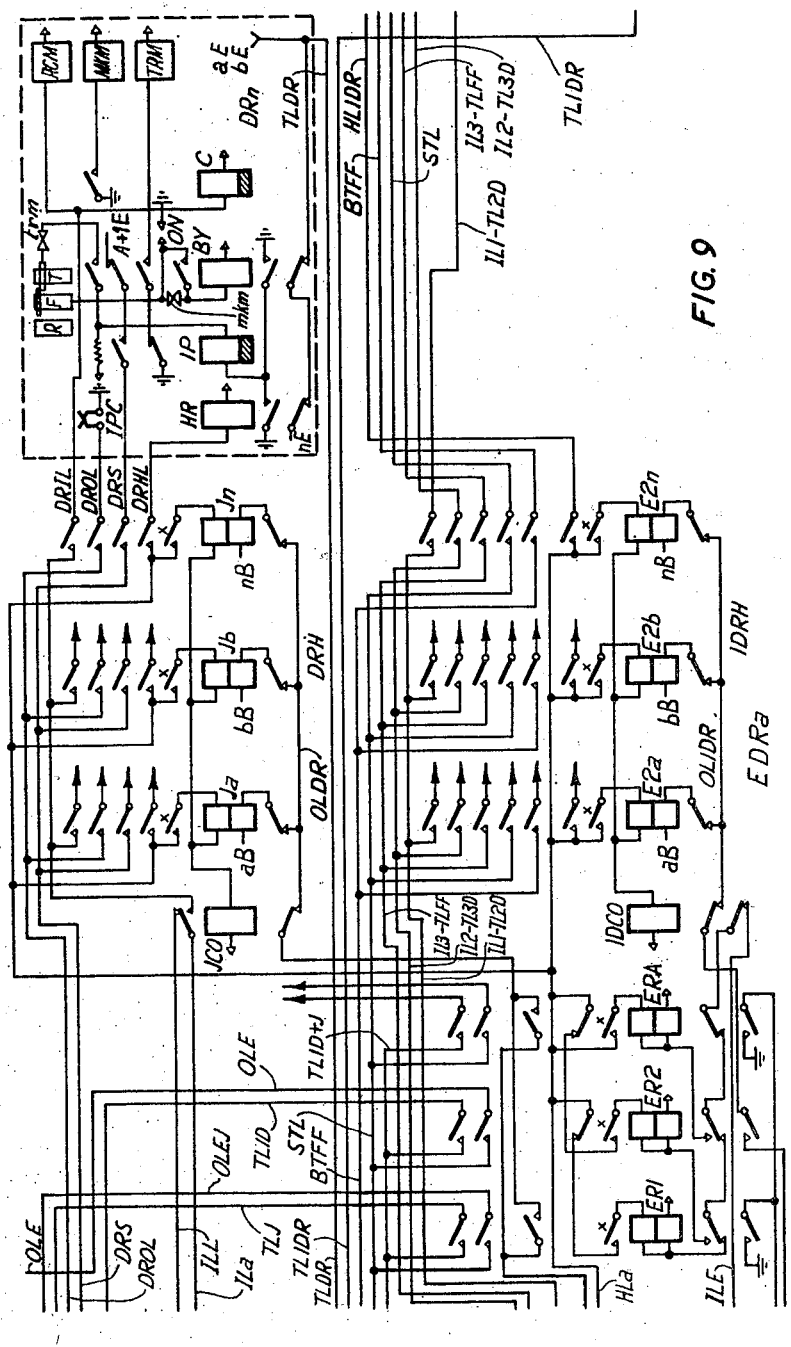

A selecting device IR11, IR1A, IRA1, IRAA which may be identical in construction with selecting device IR*a* illustrated in Figs. 7 and 8 is provided for each of the groups of internal lines and includes testing means ST11, ST1A, STA1, STAA which may be controlled in an identical way as described with reference to relay ST of Figs. 7 and 8, and serves by means of a route finder (not represented in Fig. 24 but which may be considered as a part of the selecting device IR and is illustrated in detail in Figs. 7 and 8, see relays P*p*a, P*q*a, P*x*a) to select an idle internal line of the group to which the selecting device is assigned, which line has access to an idle interexchange line. Operating means represented in Fig. 24 by OL11, OL1A, OLA1, OLAA correspond to the circuits and control means of Fig. 7 associated with leads having the prefix OL.

What is claimed is:

1. In a telecommunication exchange selecting apparatus comprising a group of interexchange lines, a plurality of groups of internal lines, numerical exchange-selecting devices, each comprising a plurality of instantly and exclusively operated independent operating members each operating member having a distinctive numerical and exchange-designating significance and connecting when operated, an inlet, common to the operating members of a numerical exchange-selecting device and connected to one of said internal lines, to an outlet having a corresponding numerical exchange-designating significance, multipling means connecting outlets of the same numerical significance of numerical exchange-selecting devices connected to an internal line selected from each of a number of said groups and constituting a plurality of distinctive routes, connecting means between said multipling leads and said interexchange lines in which one at least of the interexchange lines is connected to multipling leads of the same numerical significance but of different distinctive routes whereby such interexchange line is made accessible over a plurality of said routes and a control device assigned to each group of internal lines comprising an exchange-digit-register, test leads extended from the said group of internal lines and from the interexchange lines corresponding to the exchange designated by the exchange-digit register to said control device, operating leads extended from the operating elements of the exchange-selecting devices which operating elements correspond to the exchange designated by each exchange-digit register to said control device and testing means responsive to the signalling of an available route over said test leads to effect over an operating lead the instantaneous operation of that one of said operating elements of an exchange-designating switch in the route signalled as available.

2. In a telecommunication exchange selecting apparatus comprising a group of interexchange lines, a plurality of groups of internal lines, numerical exchange-selecting devices each comprising a plurality of instantly and exclusively operated independent operating members, each operating member having a distinctive numerical and exchange-designating significance, and connecting when operated an inlet, common to the operating members of a numerical exchange-selecting device and connected to one of said internal lines, to an outlet having a corresponding numerical exchange-designating significance, multipling means connecting outlets of the same numerical significance of numerical exchange-selecting devices connected to an internal line selected from each of a number of said groups and constituting a plurality of distinctive routes, connecting means between said multipling leads and said interexchange lines comprising non-numerical switching devices each connected to the multipling leads of a single route and having outlets connected individually to an interexchange line, at least one of the interexchange lines being connected to outlets of non-numerical switching devices of a plurality of distinctive routes, whereby such interexchange line is made accessible over a plurality of said routes and a control device assigned to each group of internal lines comprising an exchange-digit register, test leads extended from the said group of internal lines and from the interexchange lines corresponding to the exchange designated by the exchange-digit register to said control device, operating leads extended from the operating elements of the exchange selecting devices which operating elements correspond to the exchange-designated by each exchange-digit register to said control device and testing means responsive to the signalling of an available route over said test leads to effect over an operating lead the instantaneous operation of that one of said operating elements of an exchange-designating switch in the route signalled as available.

3. In a telecommunication exchange selecting apparatus comprising a group of interexchange lines, a plurality of groups of internal lines, numerical exchange-selecting devices each comprising a plurality of instantly and exclusively operated independent operating members each operating member having a distinctive numerical and exchange-designating significance, and connecting when operated an inlet, common to the operating members of a numerical exchange-selecting device and connected to one of said internal lines, to an outlet having a corresponding exchange-designating significance, multipling means connecting outlets of the same numerical significance of numerical exchange-selecting devices connected to an internal line selected from each of a number of said groups and constituting a plurality of distinctive routes, connecting means between said multipling leads and said interexchange lines, comprising interconnecting leads between one of said interchange lines and multipling leads connected to outlets of the numerical exchange-selecting devices of at least two routes and having the numerical significance of the interexchange lines whereby such interexchange line is made accessible over a plurality of said routes and a control device assigned to each group of internal lines comprising an exchange-digit register, test leads extended from the said group of internal lines and from the interexchange lines corresponding to the exchange designated by the exchange-digit register to said control device, operating leads extended from the operating elements of the exchange-selecting devices which operating elements correspond to the exchange designated by each exchange-digit register to said control device and testing means responsive to the signalling of an available route over said test leads to effect over an operating lead the instantaneous operation of an exchange-designating switch in the route signalled as available.

References Cited in the file of this patent

UNITED STATES PATENTS

| | | |
|---|---|---|
| 2,380,950 | Deakin | Aug. 7, 1945 |
| 2,535,511 | Ostline | Dec. 26, 1950 |
| 2,597,007 | Kruithof et al. | May 20, 1952 |
| 2,612,564 | Oberman | Sept. 30, 1952 |